United States Patent
Zhang et al.

(10) Patent No.: US 12,538,197 B2
(45) Date of Patent: Jan. 27, 2026

(54) ELECTRONIC DEVICE, METHOD AND STORAGE MEDIUM FOR RADIO LINK MEASUREMENT

(71) Applicant: Sony Group Corporation, Tokyo (JP)

(72) Inventors: Xuefei Zhang, Beijing (CN); Qingqing He, Beijing (CN); Hanjie Li, Beijing (CN); Fangxin Liu, Beijing (CN); Tao Cui, Beijing (CN); Haojin Li, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 608 days.

(21) Appl. No.: 17/922,603

(22) PCT Filed: May 6, 2021

(86) PCT No.: PCT/CN2021/091917
§ 371 (c)(1),
(2) Date: Nov. 1, 2022

(87) PCT Pub. No.: WO2021/223711
PCT Pub. Date: Nov. 11, 2021

(65) Prior Publication Data
US 2023/0171656 A1 Jun. 1, 2023

(30) Foreign Application Priority Data
May 8, 2020 (CN) .......................... 202010383096.X

(51) Int. Cl.
*H04W 36/00* (2009.01)
*H04W 36/30* (2009.01)
(52) U.S. Cl.
CPC ..... *H04W 36/0085* (2018.08); *H04W 36/302* (2023.05)

(58) Field of Classification Search
CPC ........... H04W 36/0085; H04W 36/302; H04W 52/0216; H04W 52/0219; H04W 52/0229;
(Continued)

(56) References Cited

U.S. PATENT DOCUMENTS

| | | | | |
|---|---|---|---|---|
| 2014/0011501 A1* | 1/2014 | Mikami | ............ | H04W 36/0085 455/437 |
| 2017/0048729 A1* | 2/2017 | Jin | ......................... | H04W 52/02 |

(Continued)

FOREIGN PATENT DOCUMENTS

| | | | |
|---|---|---|---|
| CN | 101547465 A | | 9/2009 |
| CN | 102740349 A | | 10/2012 |

(Continued)

OTHER PUBLICATIONS

International Search Report and Written Opinion mailed on Jul. 30, 2021, received for PCT Application PCT/CN2021/091917, filed on May 6, 2021, 8 pages including English Translation.

*Primary Examiner* — Joseph E Avellino
*Assistant Examiner* — Adam Joel Cerlanek
(74) *Attorney, Agent, or Firm* — XSENSUS LLP

(57) ABSTRACT

The disclosure relates to electronic devices, methods, and storage media for radio link measurements. Various embodiments are described with respect to radio link measurements. In one embodiment, an electronic device for a base station providing a serving cell for a plurality of terminal devices is provided, the electronic device including a processing circuit configured to: instruct at least one of the plurality of terminal devices to perform radio resource management measurements with a first cycle; and configure a measurement cycle relaxation mechanism for the at least one terminal device through a radio resource control signaling. In a case that the measurement cycle relaxation mechanism is enabled, the at least one terminal device performs (Continued)

radio resource management measurements with a measurement cycle greater than the first cycle.

5 Claims, 25 Drawing Sheets

(58) Field of Classification Search
CPC ............. H04W 76/28; H04W 36/0088; H04W 36/0094; H04W 24/08; Y02D 30/70
See application file for complete search history.

(56) References Cited

U.S. PATENT DOCUMENTS

| | | | |
|---|---|---|---|
| 2020/0120609 A1* | 4/2020 | Jamadagni | ........ H04W 52/0274 |
| 2020/0178133 A1* | 6/2020 | Chen | ................. H04W 36/0094 |
| 2020/0374960 A1* | 11/2020 | Deenoo | ................. H04W 72/21 |

FOREIGN PATENT DOCUMENTS

| | | | | |
|---|---|---|---|---|
| CN | 104185201 | A | 12/2014 | |
| CN | 105493551 | A | 4/2016 | |
| CN | 107426764 | A | 12/2017 | |
| WO | WO-2007053403 | A2 * | 5/2007 | ........... H04L 1/0026 |

* cited by examiner

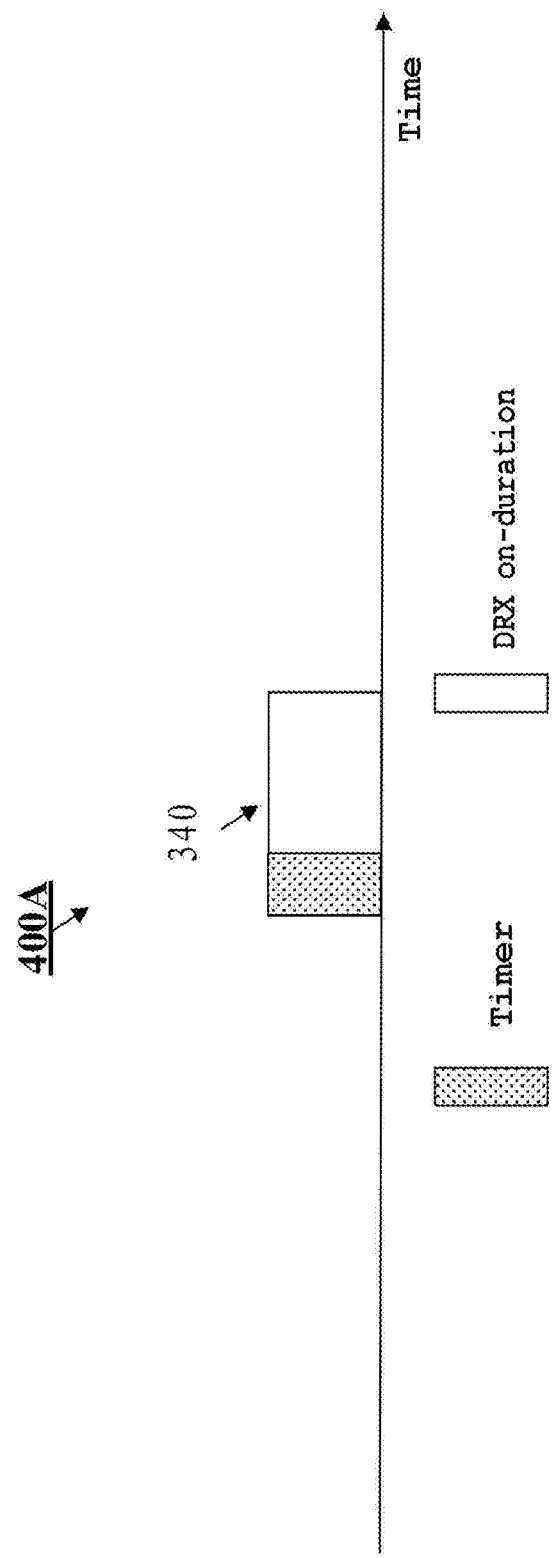

600A

602a Perform downlink measurements during measurement occasions of one or more DRX cycles 604a Determine subsequent operations of the terminal device based on a comparison of downlink quality values obtained by a certain number of measurements with one or more thresholds

Fig.18

ELECTRONIC DEVICE, METHOD AND STORAGE MEDIUM FOR RADIO LINK MEASUREMENT

CROSS-REFERENCE TO RELATED APPLICATIONS

The present application is based on PCT filing PCT/CN2021/091917, filed May 6, 2021, which claims priority to Chinese Application No. 202010383096.X, filed May 8, 2020, the entire contents of each of which are incorporated herein by reference.

TECHNICAL FIELD

The present disclosure relates generally to wireless communication systems and methods, and in particular, to techniques for radio link measurements.

BACKGROUND

In a wireless communication system, the purpose of Radio Resource Management (RRM) is to provide service quality assurance for wireless terminal devices in a network under a condition of limited bandwidth. Since terminal devices have mobility, for example, moving from the coverage of one cell to the coverage of another cell, cell reselection and handover may be required during movement. In order to ensure that a service for a terminal device remains continuous and uninterrupted during movement, the terminal device not only needs to maintain a stable communication connection with its serving cell, but also needs to constantly monitor the status of its neighboring cells. In other words, the terminal device needs to perform measurements on neighboring cells while performing the measurement for the serving cell, so as to select a suitable candidate neighboring cell for handover to the candidate neighboring cell when necessary. Therefore, it is desirable for a terminal device to be able to make accurate radio resource management measurements (herein, the radio resource management measurements include measurement on the serving cell as well as measurements on neighboring cells by the terminal device).

However, as known, measurements on serving cell or neighboring cells by a terminal device may consume power and resources. Therefore, it is desirable to find an efficient and accurate measurement control mechanism to balance low power consumption of terminal devices and high accuracy of measurement results.

In a wireless communication system, a terminal device needs to monitor downlink quality based on measurements of downlink reference signals or synchronization signals. For example, through Radio Link Monitoring (RLM), a terminal device may obtain the downlink quality to indicate whether the wireless terminal device and a upper layer on a network side are in an in-sync state. For example, through Beam Failure Detection (BFD), a terminal device can obtain the link quality of a connecting beam. The combination of BFD and beam recovery or beam switching process may enable terminal devices to always communicate with base stations through high-performance beams, thereby ensuring beamforming-based communication quality.

However, as known, making downlink measurements such as RLM or BFD by a terminal device may consume power and resources. Therefore, it is desirable to find an efficient and accurate control mechanism to achieve low energy consumption of terminal devices.

SUMMARY

A first aspect of the present disclosure relates to an electronic device for a base station. The base station provides a serving cell for a plurality of terminal devices. The electronic device includes a processing circuit configured to: instruct at least one of the plurality of terminal devices to perform radio resource management measurements with a first cycle; and configure a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle.

A second aspect of the present disclosure relates to an electronic device for a terminal device having a serving cell and neighboring cells, the electronic device including a processing circuit configured to: perform radio resource management measurement with a first cycle; and receive, from a serving cell base station, a radio resource control signaling containing configuration information of a measurement cycle relaxation mechanism, in a case that the measurement cycle relaxation mechanism is enabled, the terminal device performing radio resource management measurements with a measurement cycle greater than the first cycle.

A third aspect of the present disclosure relates to a method for a base station that provides a serving cell for a plurality of terminal devices, the method comprising: instructing at least one of the plurality of terminal devices to perform radio resource management measurements with a first cycle; and configuring a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle.

A fourth aspect of the present disclosure relates to a method for a terminal device having a serving cell and neighboring cells, the method comprising: performing radio resource management measurements with a first cycle; and receiving, from a serving cell base station, a radio resource control signaling containing configuration information of a measurement cycle relaxation mechanism, in a case that the measurement cycle relaxation mechanism is enabled, the terminal device performing radio resource management measurements with a measurement cycle greater than the first cycle.

A fifth aspect of the present disclosure relates to an electronic device for a terminal device. The electronic device includes a processing circuit configured to perform downlink measurements during measurement occasions of one or more DRX cycles, wherein the measurement occasions correspond to specific time-frequency resources. The processing circuit is further configured to determine subsequent operations of the terminal device based on a comparison of downlink quality values obtained by a certain number of measurements with one or more thresholds. The subsequent operations include at least the terminal device not performing downlink measurements at a subsequent certain period of time or during measurement occasions of a certain number of subsequent DRX cycles, or the terminal device waking up.

A sixth aspect of the present disclosure relates to a method for communication. The method comprises performing, by a terminal device, downlink measurements during measurement occasions of one or more DRX cycles, wherein the measurement occasions correspond to specific time-frequency resources. The method further comprises determining, by the terminal device, subsequent operations of the terminal device based on a comparison of downlink quality values obtained by a certain number of measurements with one or more thresholds. The subsequent operations include at least the terminal device not performing downlink measurements at a subsequent certain period of time or during measurement occasions of a certain number of subsequent DRX cycles, or the terminal device waking up.

A seventh aspect of the present disclosure relates to a computer-readable storage medium storing one or more instructions, which, when executed by one or more processors of an electronic device, cause the electronic device to perform the methods according to various embodiments of the present disclosure.

An eighth aspect of the present disclosure relates to an apparatus for wireless communication, comprising components or units for performing the methods according to various embodiments of the present disclosure.

A ninth aspect of the present disclosure relates to a computer program product comprising instructions, which, when executed by a computer, cause the computer to perform the methods according to various embodiments of the present disclosure.

The above summary is provided to summarize some exemplary embodiments in order to provide a basic understanding to various aspects of the subject matter described herein. Therefore, above features are merely examples and should not be construed as limiting the scope or spirit of the subject matter described herein in any way. Other features, aspects, and advantages of the subject matter described herein will become apparent from the Detailed Description described below in conjunction with the accompanying drawings.

BRIEF DESCRIPTION OF THE DRAWINGS

A better understanding of the present disclosure can be obtained when the following detailed description of embodiments is considered in conjunction with the accompanying drawings. The same or similar reference numbers are used throughout various drawings to denote the same or similar components. The accompanying drawings, along with the following detailed description, are incorporated in and constitute apart of this specification, to illustrate embodiments of the disclosure and to explain the principles and advantages of the disclosure. Wherein:

FIG. 16 illustrates a schematic diagram of a fourth example of downlink measurement according to an embodiment of the present disclosure.

FIG. 18 illustrates an example method for a terminal device according to an embodiment of the present disclosure.

While the embodiments described in this disclosure may be susceptible to various modifications and alternatives, specific embodiments thereof are illustrated by way of example in the accompanying drawings and are described in detail herein. It should be understood, however, that the drawings and detailed description thereof are not intended to limit the embodiments to the particular form disclosed, rather, it is intended to cover all modifications, equivalents and alternative falling within the spirit and scope of the claims.

DETAILED DESCRIPTION

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Figure 1:
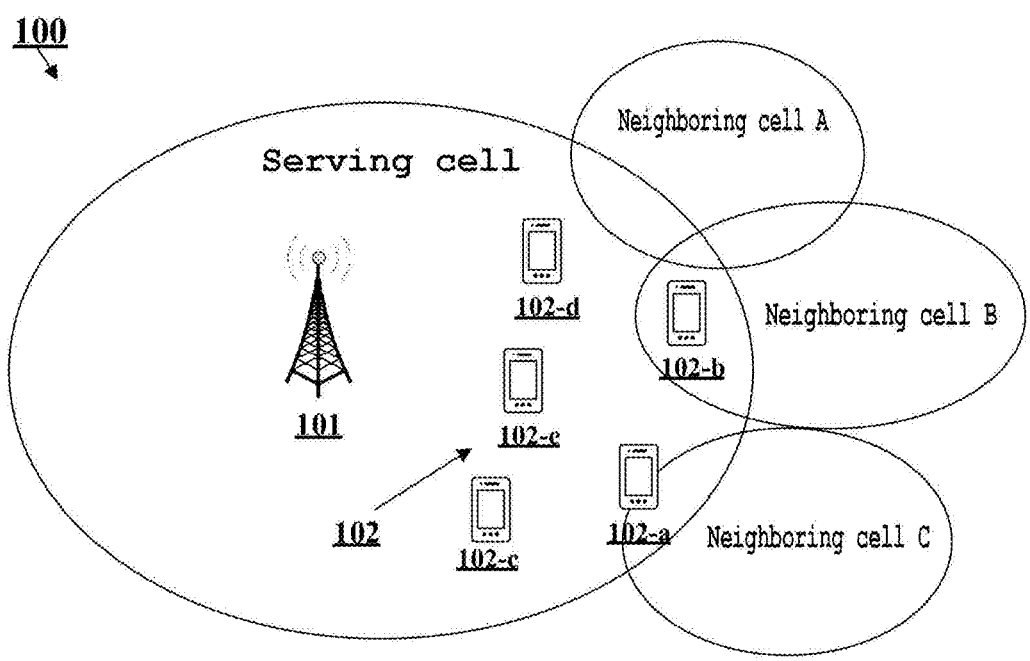
FIG. 1 illustrates an example scenario diagram of a wireless communication system according to an embodiment of the present disclosure.

FIG. 1 illustrates an example scenario diagram of a wireless communication system according to an embodiment of the present disclosure. It should be understood that, FIG. 1 illustrates only one of many types and possible arrangements for wireless communication systems; features of the present disclosure can be implemented in any of a variety of systems as desired.

As shown in FIG. 1, the wireless communication system 100 includes a plurality of cells, and one cell includes a base station 101 and one or more terminal devices 102 (as an example, the terminal device 102 includes 102-a, 102-b, 102-c, 102-d, 102-e). A cell in which the terminal device 102 is served by the base station 101 is referred to as a serving cell (herein, base station 101 and serving cell base station 101 can be used interchangeably), and cells in the vicinity of the serving cell are referred to as neighboring cells (as an example, including neighboring cell A, neighboring cell B, and neighboring cell C). The serving cells and neighboring cells can be, for example, cellular cells, small cells, micro cells, femto cells, and the like. The base station and the terminal device may be configured to communicate over a wireless transmission medium. The base station 101 can also be configured to communicate with a network (e.g., a core network of a cellular service provider, a telecommunications network such as a public switched telephone network (PSTN), and/or the Internet, not shown). Thus, the base station may facilitate communication between terminal devices and/or between terminal devices and networks.

It should be understood that the term base station herein has the full breadth of its ordinary meaning and includes at least a wireless communication station used as a part of a wireless communication system or a radio system to facilitate communication. Examples of base stations may include, but are not limited to, the following: at least one of a base transceiver station (BTS) and a base station controller (BSC) in a GSM system; at least one of a radio network controller (RNC) and a Node B in a WCDMA system; an eNB in an LTE and an LTE-Advanced system; an access point (AP) in a WLAN, WiMAX™ system; and a corresponding network node in a communication system to be or under development (e.g., gNB, eLTE eNB, etc. in a 5G New Radio (NR) system). Some of the functions of the base station herein can also be implemented as an entity with a control function for communication in D2D, M2M and V2V communication scenarios, or as an entity playing spectrum coordination role in cognitive radio communication scenarios.

The term terminal device herein has the full breadth of its ordinary meaning. For example, a terminal device can be a Mobile Station (MS), an User Equipment (UE), and so on. A terminal device can be implemented as a device such as a mobile phone, a handheld device, a media player, a computer, a laptop or tablet, or almost any kind of wireless device. In some cases, terminal devices may communicate using a variety of wireless communication technologies. For example, terminal devices may be configured to communicate using two or more of GSM, UMTS, CDMA2000, WIMAX™, LTE, LTE-A, WLAN, NR, Bluetooth, and the like. In some cases, terminal devices can also be configured to communicate using only one wireless communication technology.

For each terminal device 102, one radio resource management measurement is performed at intervals of certain cycle, and the radio resource management measurement includes serving cell measurement and neighboring cell measurement. As an example, measurement result includes at least one of a measured reference signal received power (RSRP) value or a reference signal received quality (RSRQ) value of a serving cell or a neighboring cell. In situations where the terminal device 102 is not at the edge of the serving cell or where the terminal device is stationary or moving at a low speed, performing measurements frequently will result in a large amount of power consumption of the terminal device. Therefore, when the mobility of the terminal device 102 is weak, its radio resource management measurements can be relaxed appropriately. In other words, when it is determined that the terminal device 102 will not move to a neighboring cell anytime soon, relaxed radio resource management measurements can be made to save power and energy consumption of the terminal device.

In order to achieve above purpose of reducing power consumption, there are two ways that can be used to save power consumption: (1) increase the measurement cycle, (2) reduce the number of neighboring cells that each terminal device needs to measure, or reduce the number of terminal devices measuring neighboring cells. However, saving power consumption only by simply increasing the measurement cycle may introduce large measurement errors. In one embodiment of the present disclosure, the measurement cycle can be appropriately adjusted dynamically so that the overall measurement times are reduced. In another embodiment of the present disclosure, the number of neighboring cells that a terminal device needs to measure or the number of terminal devices that perform neighboring cell measurements can be adjusted according to appropriate rules, so as to reduce the number of neighboring cells that a terminal device needs to measure or the number of terminal devices that perform neighboring cell measurements as a whole. The above operations can ensure the accuracy and validity of radio resource management measurements while reducing power consumption of terminal devices.

In some embodiments, the terminal device 102 may reduce associated power consumption by performing fewer downlink measurements. For example, under the Discontinuous Reception (DRX) mechanism, the terminal device 102 may not necessarily perform downlink measurements, including RLM or BFD, during a Measurement Occasion (MO) of each DRX cycle. Subsequent measurement operations by the terminal device 102 may be determined based on a comparison of a downlink quality value obtained through a certain number of measurements with one or more thresholds. In contrast to performing downlink measurements during every measurement occasion of each DRX cycle, measurements according to the present disclosure can be considered as relaxed measurements.

In some embodiments, the terminal device 102 may only listen to the channel for a portion of the on-duration of the DRX cycle to reduce associated power consumption. For example, after completion of beam switching, the terminal device 102 may only listen to the channel for the first part of the on-duration for the immediate following DRX cycle. If the terminal device 102 does not receive any information or message from the base station 101 within a certain period of time, it may go to sleep in advance before the end of the on-duration. Specific techniques that may be used by the terminal device 102 to reduce power consumption will be described in detail hereinafter.

Figure 2:
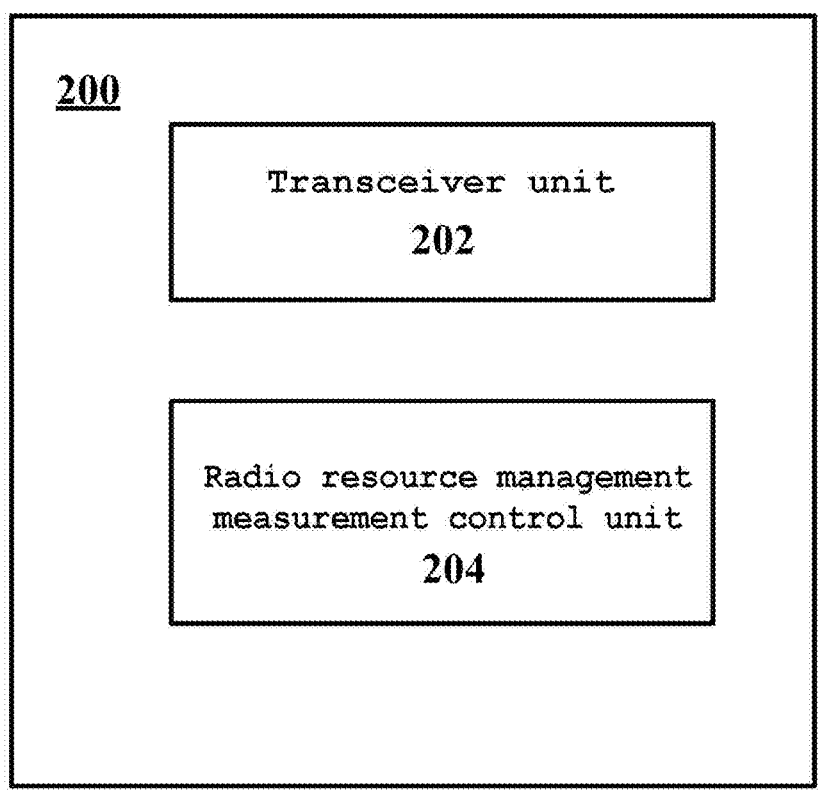
FIG. 2 illustrates an exemplary electronic device for a base station according to an embodiment of the present disclosure.

FIG. 2 illustrates an exemplary electronic device 200 for the base station 101 in the system 100 according to an embodiment of the present disclosure. The electronic device 200 shown in FIG. 2 may include various units to implement various embodiments according to the present disclosure. In this example, the electronic device 200 includes a transceiver unit 202 and a radio resource management measurement control unit 204. In one implementation, the electronic device 200 is implemented as the base station 101 itself or a part thereof, or as a device for controlling the base station 101 or otherwise associated with the base station 101 (e.g., a base station controller) or as a part thereof. Various operations described below in conjunction with a base station can be implemented by the units 202 and 204 or other possible units of the electronic device 200.

In an embodiment, the transceiver unit 202 may be configured to transmit signals to or receive signals from the terminal device 102 in the system 100. For example, the transceiver unit 202 may transmit a signal to the terminal device(s) 102 in a cell served by the base station 101 to instruct the terminal device to perform radio resource management measurements with a first cycle, wherein the radio resource management measurements include measurements on the serving cell and measurements on its neighboring cells by the terminal device. The radio resource management measurement control unit 204 may be configured to configure a measurement cycle relaxation mechanism for the terminal device 102 through a radio resource control signaling. In a case that the measurement cycle relaxation mechanism is enabled, the above terminal device 102 may perform radio resource management measurements with a measurement cycle greater than the first cycle.

It should be understood that the transceiver unit 202 of the electronic device 200 may send the radio resource control signaling containing the measurement cycle relaxation mechanism to the terminal device 102, so that the terminal device 102 autonomously enables the measurement cycle relaxation mechanism. Alternatively, the electronic device 200 may receive the serving cell measurement result of the terminal device from the terminal device 102 via the transceiver unit 202, and then determine by its radio resource management measurement control unit 204 that the measurement result of the terminal device 102 satisfies conditions of the measurement cycle relaxation mechanism, thereby sending an instruction to enable the measurement cycle relaxation mechanism to the terminal device 102 by using the transceiver unit 202.

Figure 3:
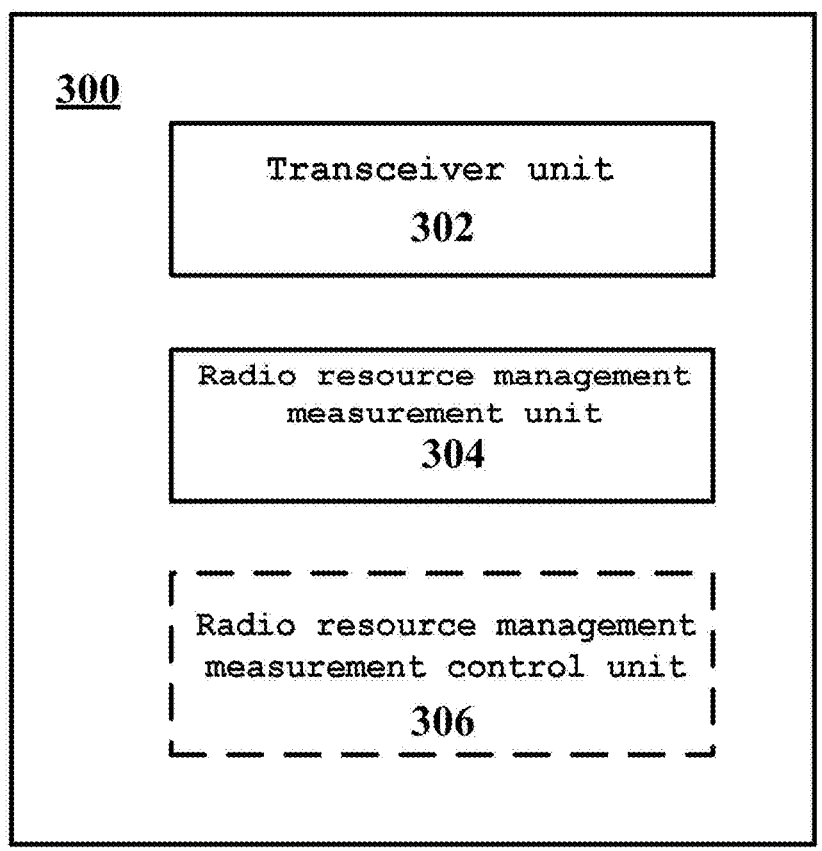
FIG. 3 illustrates an exemplary electronic device for a terminal device according to an embodiment of the present disclosure.

FIG. 3 illustrates an exemplary electronic device 300 for the terminal device 102 in the system 100 according to an embodiment of the present disclosure. The electronic device 300 shown in FIG. 3 may include various units to implement various embodiments according to the present disclosure. In this example, the electronic device 300 includes a transceiver unit 302 and a radio resource management measurement unit 304. In one implementation, the electronic device 300 is implemented as the terminal device 102 itself or a part thereof, or as a device for controlling the terminal device 102 or otherwise associated to the terminal device 102 or as a part thereof. Various operations described below in connection with the terminal device can be implemented by the units 302 and 304 or other possible units of the electronic device 300.

In an embodiment, the radio resource management measurement unit 304 of the electronic device 300 may be configured to perform radio resource management measurements with the first cycle. The transceiver unit 302 may be configured to transmit signals to or receive signals from the base station 101 in the system 100. For example, the transceiver unit 302 may receive from the serving cell base station 101 a radio resource control signaling containing configuration information of the measurement cycle relaxation mechanism. In a case that the measurement cycle relaxation mechanism is enabled, the radio resource management measurement unit 304 performs radio resource management measurements with a measurement cycle greater than the first cycle.

It should be understood that the electronic device 300 of the terminal device 102 can send the serving cell measurement result to the base station 101 via the transceiver unit 302, and after the base station 101 determines that the measurement result satisfies conditions for enabling the measurement cycle relaxation mechanism, receive an indication from base station 101 to enable the measurement cycle relaxation mechanism via the transceiver unit 302. Optionally, the electronic device 300 may further include a radio resource management measurement control unit 306 (in the present disclosure, in addition to explicit mentioned in the description, dotted lines in the drawings are generally used to indicate optional). Alternatively, the electronic device 300 may autonomously enable the measurement cycle relaxation mechanism through the radio resource management measurement control unit 306 according to the conditions for enabling the measurement cycle relaxation mechanism included in the received radio resource control signaling.

In some embodiments, the electronic devices 200 and 300 can be implemented at the chip level, or may also be implemented at the device level by including other external components (e.g., radio links, antennas, etc.). For example, each electronic device can function as a communication device as a whole.

It should be noted that above units are only logical modules divided according to specific functions they implement, and are not used to limit specific implementations. For example, they can be implemented in software, hardware, or a combination of software and hardware. In practical implementations, above units can be implemented as independent physical entities, or can also be implemented by a single entity (e.g., a processor (CPU or DSP, etc.), an integrated circuit, etc.). Wherein, the processing circuit may refer to various implementations of digital circuitry, analog circuitry, or hybrid signal (combination of analog and digital) circuitry that perform functions in a computing system. The processing circuits may include, for example, circuits such as Integrated Circuits (ICs), Application Specific Integrated Circuits (ASICs), portions or circuits of individual processor cores, entire processor cores, individual processors, programmable hardware devices such as Field Programmable Gate Arrays (FPGAs), and/or systems including multiple processors.

Measurement Cycle Relaxation Mechanism

Figure 4:
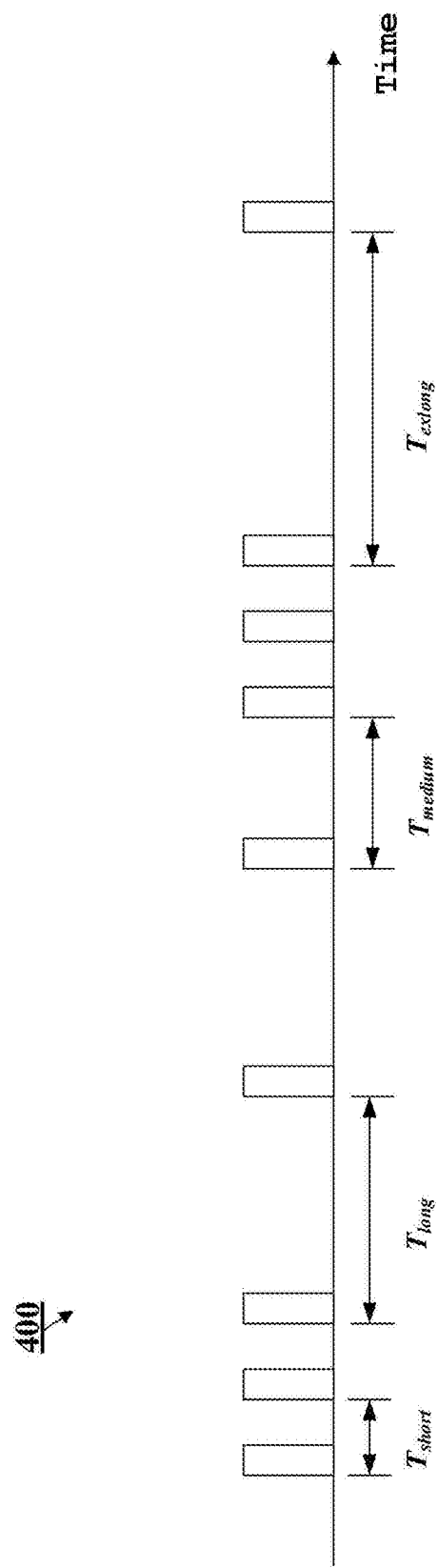
FIG. 4 illustrates an example schematic diagram of a measurement cycle relaxation mechanism according to an embodiment of the present disclosure.

FIG. 4 illustrates an example schematic 400 of a measurement cycle relaxation mechanism according to an embodiment of the present disclosure. In the present disclosure, the measurement relaxation mechanism intends to trade off power consumption of terminal devices and accuracy and validity of the radio resource management measurements. For example, the measurement cycle is appropriately increased when the variation of measurement results is small (more stable) and/or the value of measurement result is large, and the measurement cycle is appropriately decreased when the variation of measurement results is large (less stable) and/or the value of measurement result is small. Several examples of measurement cycles involved in the measurement cycle relaxation mechanism are shown in FIG. 4.

Specifically, as described above, the terminal device 102 may first perform radio resource management measurements with a first cycle (i.e., the measurement cycle $T_{short}$ shown in FIG. 4). When the serving cell measurement result of the terminal device satisfies certain conditions, a measurement cycle relaxation mechanism can be enabled. For example, when it is determined that the fluctuation level of the serving cell measurement result of the terminal device 102 is greater than a first fluctuation threshold (which may also be referred to as a fluctuation threshold $S_{medium}$ in this disclosure), and/or the value of the serving cell measurement result is greater than a first measurement threshold (which may also be referred to as measurement threshold $P_{medium}$ in this disclosure), a measurement cycle relaxation mechanism may be enabled. After the measurement cycle relaxation mechanism is enabled, the terminal device 102 may perform measurements with a second cycle (i.e., the measurement cycle $T_{long}$ shown in FIG. 4) greater than the first cycle. In other words, when the variation of the serving cell measurement result of the terminal device 102 is small, it means that the mobility of the terminal device is small and its location is relatively stable; when the value of the serving cell measurement result of the terminal device 102 is large, it means that the terminal device is far from the edge of the serving cell and is less likely to move into neighboring cells. Therefore, in above scenarios, measurements need not be performed frequently, and the measurement cycle can be increased to reduce power consumption of the terminal device 102.

In one embodiment, in a case that the measurement cycle is a second cycle ($T_{long}$) when the fluctuation level of the serving cell measurement result of the terminal device 102 is higher than a second fluctuation threshold (which may also be referred to as a fluctuation threshold $S_{high}$ in the present disclosure) and/or the value of the serving cell measurement result is less than a second measurement threshold (which may also be referred to as a measurement threshold $P_{low}$ in this disclosure), or the measurement cycle is the second cycle for a certain period of time (for example, the period of time may be a predefined period of time), the terminal device 102 may perform measurements with a first cycle ($T_{short}$). Optionally, the terminal device 102 may also perform measurements with a third cycle (i.e., the measurement cycle $T_{medium}$ shown in FIG. 4). In the above embodiment, the second fluctuation threshold ($S_{high}$) may be greater than or equal to the first fluctuation threshold ($S_{medium}$), the second measurement threshold ($P_{low}$) may be less than or equal to the first measurement threshold ($P_{medium}$), and the third cycle ($T_{medium}$) may be less than the second cycle ($T_{long}$) and greater than the first cycle ($T_{short}$). In other words, when the variation of the serving cell measurement results of the terminal device 102 is large, it means that the mobility of the terminal device is large and the location becomes unstable; when the value of the serving cell measurement result of the terminal device 102 is small, it means that the terminal device is far from the center of the serving cell and closer to the edge of the serving cell. Therefore, in the above scenarios, it is necessary to appropriately increase measurement frequency, that is, to reduce the measurement cycle to ensure the accuracy and validity of the measurements. The specific reduction degree of the measurement cycle may be determined by the base station 101 or the terminal device 102 according to the specific fluctuation level and/or value of the measurement result.

In another embodiment, in a case that the measurement cycle is a second cycle ($T_{long}$) when the fluctuation level of the serving cell measurement result of the terminal device 102 is lower than a third fluctuation threshold (which may also be referred to as a fluctuation threshold $S_{low}$ in the present disclosure) less than the first fluctuation threshold ($S_{medium}$) and/or the value of the serving cell measurement result is greater than a third measurement threshold (which may also be referred to as a fluctuation threshold $P_{high}$ in the present disclosure), the terminal device 102 may perform measurements with a fourth cycle ($T_{exlong}$) greater than the second cycle ($T_{long}$). In other words, when the variation of serving cell measurement results of the terminal device 102 is small and further decreases, it means that the mobility of the terminal device is very small and its location is very stable; when the value of the terminal device 102 is large and further increases, it means that the terminal device is farther from the edge of its serving cell. Therefore, in above scenarios, the measurement cycle can be further increased to further reduce power consumption of the terminal device 102.

It should be understood that, when the measurement result of the terminal device 102 satisfies certain conditions, the measurement cycle relaxation mechanism may also be disabled. For example, when the fluctuation level of the measurement result of the terminal device 102 is greater than a fourth fluctuation threshold (which may also be referred to as a fluctuation threshold $S_{exhigh}$ in this disclosure, and $S_{exhigh}$ is greater than $S_{high}$), and/or the value of the measurement result is less than a fourth measurement threshold (which may also be referred to as a measurement threshold $P_{exlow}$ in this disclosure, and $P_{exlow}$ is less than $P_{low}$). This indicates that the terminal device is moving very fast and/or the terminal device is very close to the edge of the serving cell, so that the measurement cycle relaxation mechanism can be disabled and perform frequent radio resource management measurements for the terminal device with a smaller cycle (e.g. the first cycle or a cycle less than the first cycle). It should also be understood that, similar to enabling the measurement cycle relaxation mechanism, the base station 101 may include the conditions for disabling the measurement cycle relaxation mechanism in a radio resource control signaling and send it to the terminal device 102, so that the terminal device autonomously disables the measurement cycle relaxation mechanism; the base station 101 may also receive the serving cell measurement result from the terminal device 102, and instruct the terminal device to disable the measurement cycle relaxation mechanism in the case of determining that the measurement result satisfies disable conditions.

Figure 5:
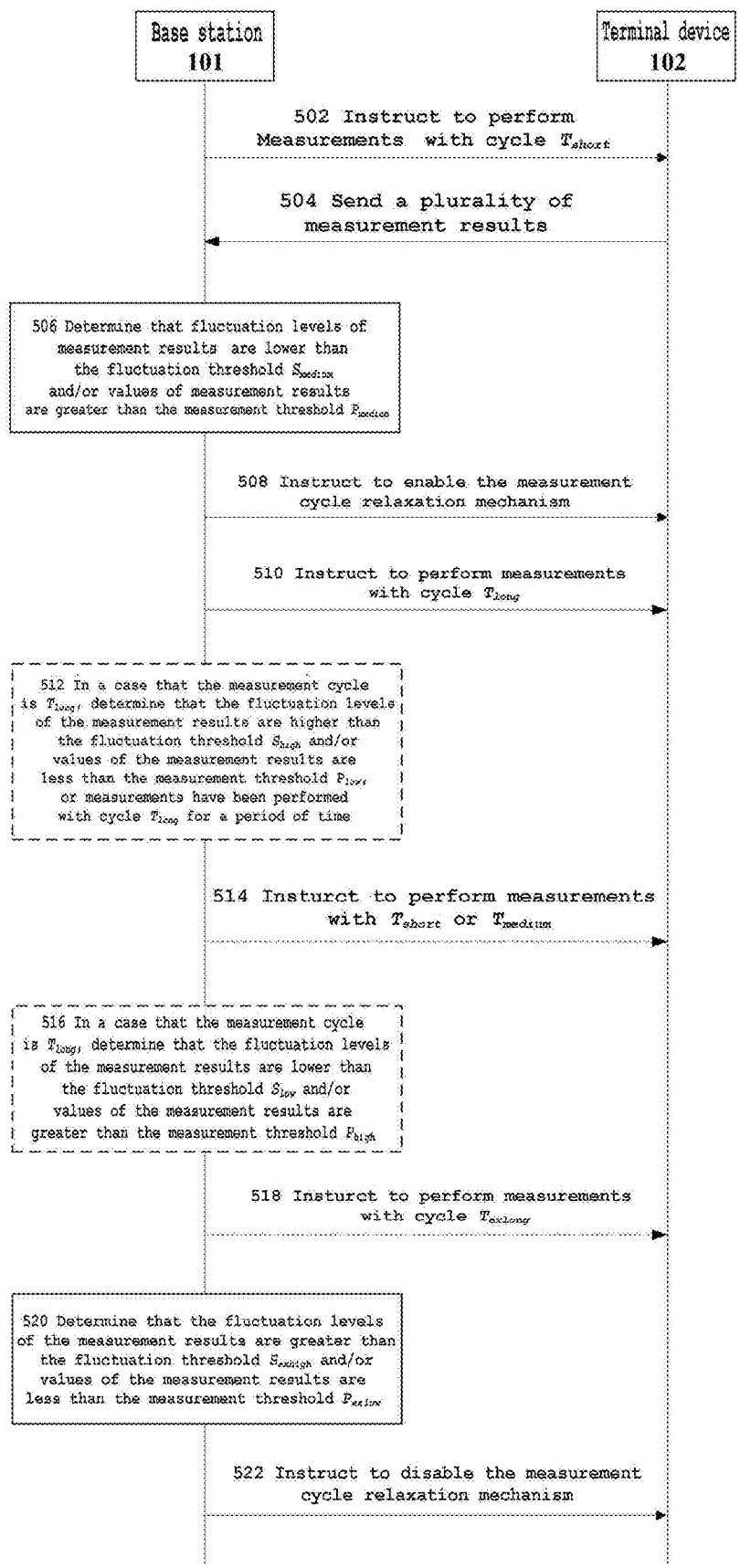
FIG. 5 illustrates an interaction diagram for a first example of a measurement cycle relaxation mechanism between a base station and a terminal device according to an embodiment of the present disclosure.
Figure 6:
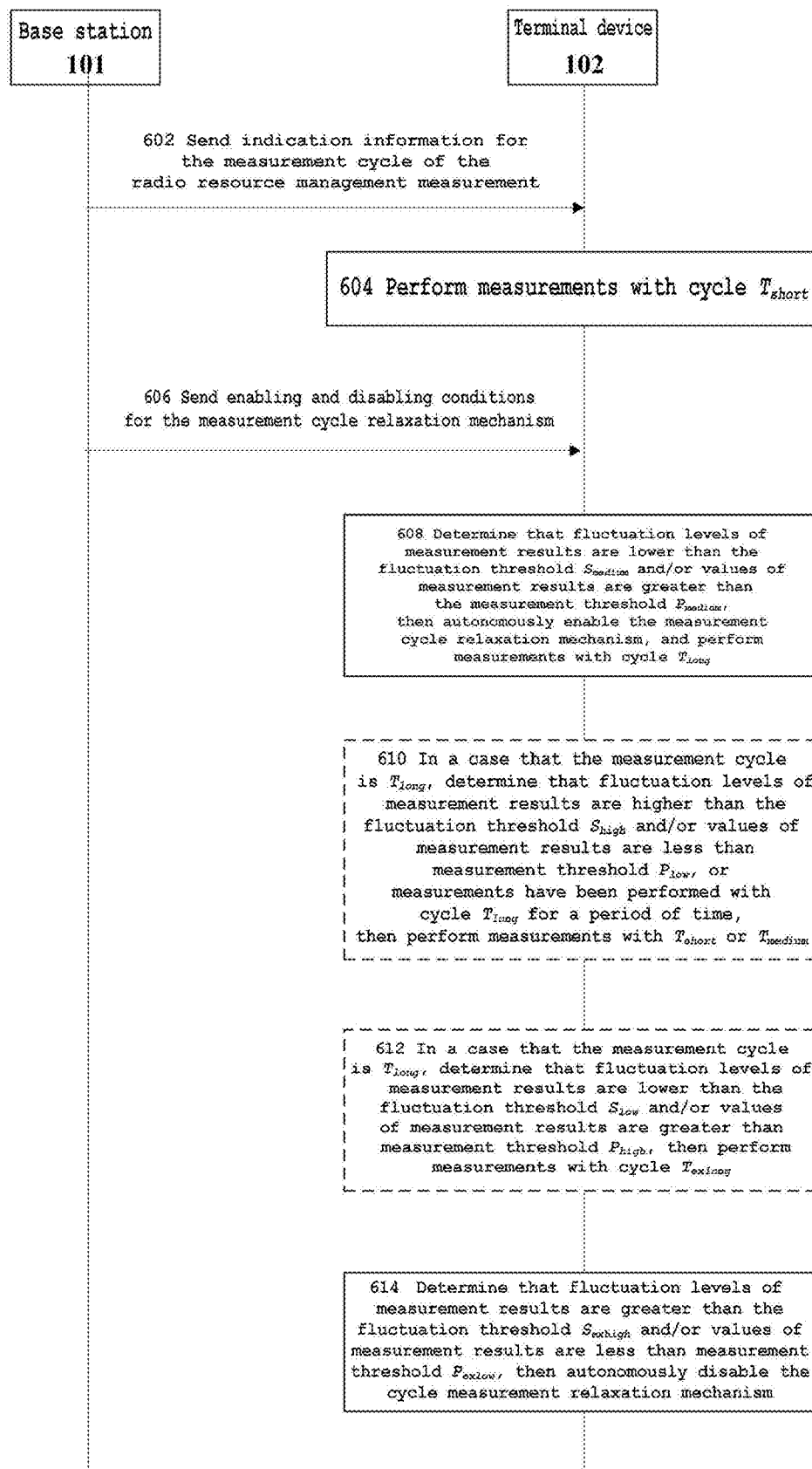
FIG. 6 illustrates an interaction diagram for a second example of a measurement cycle relaxation mechanism between a base station and a terminal device according to an embodiment of the present disclosure.

Corresponding to the example of the measurement cycle relaxation mechanism in FIG. 4, FIG. 5 and FIG. 6 respectively illustrate interaction diagrams for a first example and a second example of a measurement cycle relaxation mechanism between a base station and a terminal device according to embodiments of the present disclosure. Both of these example processes may be performed by the base station 101 or the electronic device 200 and the terminal device 102 or the electronic device 300 described above.

In the first example shown in FIG. 5, at 502, the base station 101 (e.g., through the transceiver unit 202) may send an indication to the terminal device 102 to perform measurements with a first cycle ($T_{short}$). At 504, the terminal device 102 may send a plurality of serving cell measurement results to the base station 101 (e.g., through the transceiver unit 302). At 506, the base station 101 (e.g., through the radio resource management measurement control unit 204) determines a fluctuation level and/or value of the above plurality of measurement results, and in response to the fluctuation level being lower than that a first fluctuation threshold ($S_{medium}$) and/or the value of measurement result is greater than a first measurement threshold $P_{medium}$), sends an indication to enable the measurement cycle relaxation mechanism to the terminal device 102 at 508, and instructs the terminal device 102 to perform cell measurements with a second cycle ($T_{long}$) greater than the first cycle ($T_{short}$) at 510.

In one embodiment, additionally or alternatively, in a case that the measurement cycle is a second cycle ($T_{long}$), at 512, the base station 101, in response to determining that the fluctuation level of the measurement result of the terminal device 102 is higher than a second fluctuation threshold ($S_{high}$) and/or the value of the measurement result is less than a second measurement threshold ($P_{low}$), or the measurement cycle has been the second cycle ($T_{long}$) for a certain period of time (for example, the period of time may be a predefined period of time), the base station 101 at 514 may instruct the terminal device 102 to perform measurements with the first cycle ($T_{short}$) or (optionally) with the third cycle ($T_{medium}$). Wherein, the second fluctuation threshold ($S_{high}$) may be greater than or equal to the first fluctuation threshold ($S_{medium}$), the second measurement threshold ($P_{low}$) may be less than or equal to the first measurement threshold ($P_{medium}$), and the third cycle ($T_{medium}$) may be less than the second cycles ($T_{long}$) and greater than the first cycle ($T_{short}$). In another embodiment, additionally or alternatively, in a case that the measurement cycle is the second cycle ($T_{long}$), at 516, the base station 101 may instruct the terminal device 102 to perform measurements with a fourth cycle ($T_{exlong}$) greater than the second cycle ($T_{long}$) in response to determining that the fluctuation level of the measurement result of the terminal device 102 is lower than a third fluctuation threshold (Stow) less than the first fluctuation threshold ($S_{medium}$), and/or determining that the value of the measurement result is greater than a third measurement threshold ($P_{high}$) larger than the first measurement threshold ($P_{medium}$).

In a case of any measurement cycle, when the base station 101 determines that the fluctuation level of the serving cell measurement result of the terminal device 102 is greater than the fourth fluctuation threshold ($S_{exhigh}$) and/or the value of the measurement result is less than the fourth measurement threshold ($P_{exlow}$) (wherein $S_{exhigh}$ may be greater than $S_{high}$ and $P_{exlow}$ may be less than $P_{low}$) (520), it may instruct the terminal device 102 to disable the cycle measurement relaxation (522). Thereafter, the terminal device 102 may perform radio resource management measurements with a smaller measurement cycle.

FIG. 6 illustrates an interaction diagram for a second example of a measurement cycle relaxation mechanism between a base station and a terminal device according to an embodiment of the present disclosure. FIG. 6 can be understood in conjunction with the example of FIG. 5. The main difference between the two is that in FIG. 6, the terminal device 102 instead of the base station 101 performs control function of the measurement cycle relaxation mechanism, that is, the terminal device 102 autonomously enables or disables the measurement cycle relaxation mechanism, and the terminal device 102 autonomously determines the fluctuation level and/or the value of its serving cell measurement result and selects a corresponding measurement cycle for measurement in response to the fluctuation level and/or the value.

As shown in FIG. 6, at 602, the base station 101 sends indication information about the measurement cycle of the radio resource management measurement to the terminal device 102 (for example, the indication information may be included in a radio resource control signaling), and the indication information may include a value such as the first cycle ($T_{short}$), the second cycle ($T_{long}$), the third cycle ($T_{medium}$), and the fourth cycle ($T_{exlong}$) then the terminal device performs measurement at 604 with the first cycle ($T_{short}$). At 606, the base station 101 sends to the terminal device 102 the enabling conditions and disabling conditions for the measurement cycle relaxation mechanism. Thereafter, at 608, the terminal device 102 determines that the fluctuation level of its serving cell measurement result is lower than the first fluctuation threshold ($S_{medium}$) and/or the value of the measurement result is greater than the first measurement threshold ($P_{medium}$), thus determines that conditions for enabling measurement cycle relaxation mechanism are satisfied and autonomously enables the measurement cycle relaxation mechanism, and performs radio resource management measurements with a second cycle ($T_{long}$) greater than the first cycle ($T_{short}$).

In one embodiment, additionally or alternatively, in a case that the measurement cycle is a second cycle ($T_{long}$), the terminal device 102 determines at 610 that the fluctuation level of its serving cell measurement result is higher than a second fluctuation threshold ($S_{high}$) and/or the value of the measurement result is less than the second measurement threshold ($P_{low}$), or the measurement cycle is the second cycle ($T_{long}$) for a certain period of time (for example, the period of time may be a predefined period of time), thereby selecting the first cycle ($T_{short}$) or (optionally) with the third cycle ($T_{medium}$) to perform measurements. Wherein, the second fluctuation threshold ($S_{high}$) may be greater than or equal to the first fluctuation threshold ($S_{medium}$), the second measurement threshold ($P_{low}$) may be less than or equal to the first measurement threshold ($P_{medium}$), and the third cycle ($T_{medium}$) may be less than the second measurement cycle ($T_{long}$) and greater than the first cycle ($T_{short}$). In another embodiment, additionally or alternatively, in a case that the measurement cycle is the second cycle ($T_{long}$), the terminal device 102 determines at 612 that the fluctuation level of its measurement result is lower than a third fluctuation threshold (Stow) less that the first fluctuation threshold ($S_{medium}$), and/or determines that the value of the measurement result is greater than a third measurement threshold ($P_{high}$) larger than the first measurement threshold ($P_{medium}$), thereby selecting a fourth cycle ($T_{exlong}$) larger than the second cycle to perform measurements.

In a case of any measurement cycle, at 614, when the terminal device 102 determines that the fluctuation level of its serving cell measurement result is greater than a fourth fluctuation threshold ($S_{exhigh}$) and/or the value of the measurement result is less than a fourth measurement threshold (P exlow) (where $S_{exhigh}$ may be greater than $S_{high}$ and $P_{exlow}$ may be less than $P_{low}$), it may be determined that conditions for disabling the measurement cycle relaxation mechanism are satisfied, and the cycle measurement relaxation mechanism is autonomously disabled. Thereafter, the terminal device 102 may perform measurements with a smaller cycle.

In the measurement relaxation mechanism, not only can the measurement cycle be dynamically adjusted according to the fluctuation level and/or value of the measurement result of the terminal device as described above, but also power consumption of the terminal device can be reduced by reducing the number of time to send measurement results by the terminal device to the base station within a certain period of time. An example process for reducing the number of times to report radio resource management measurements according to an embodiment of the present disclosure is described below in conjunction with FIG. 7, which can be executed by above base station 101 or the electronic device 200 and the terminal device 102 or the electronic device 300.

Figure 7:
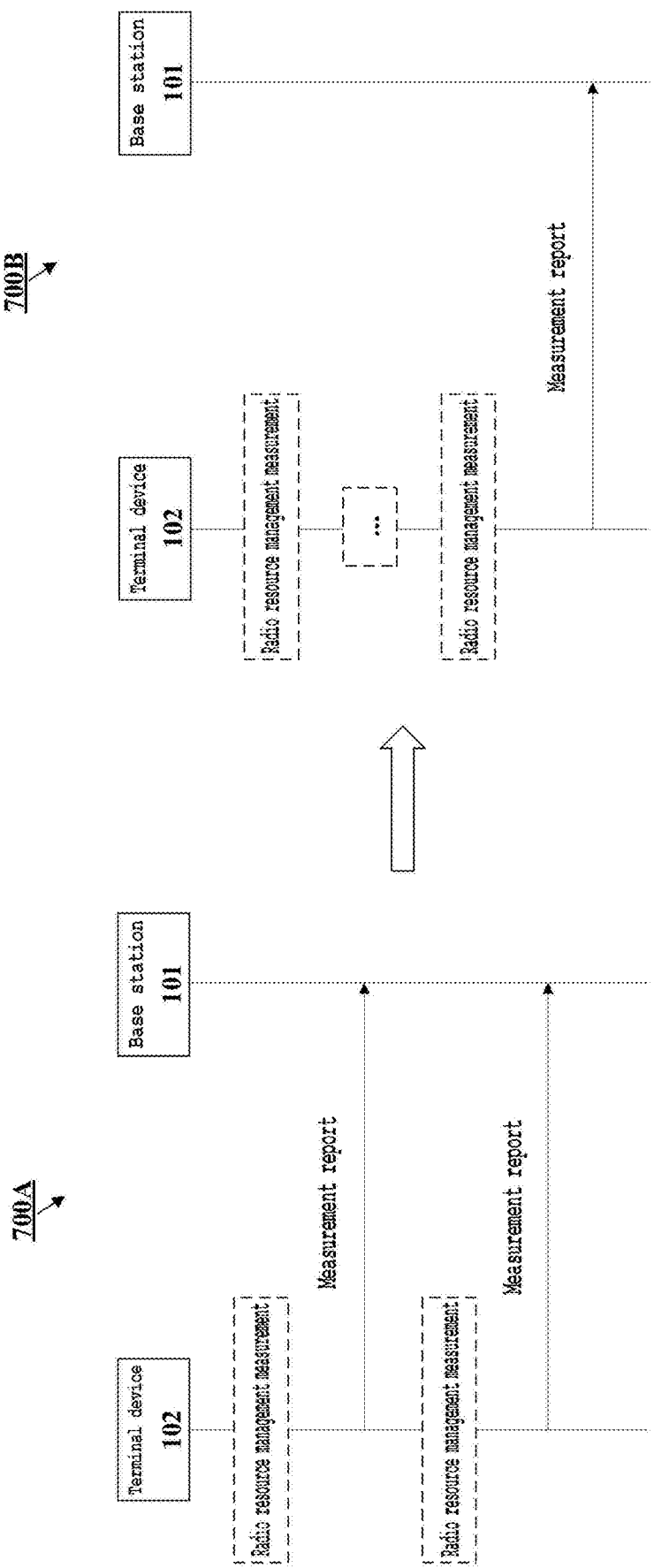
FIG. 7 illustrates an example process for reducing the number of times to report radio resource management measurements according to an embodiment of the present disclosure.

700A in FIG. 7 illustrates an example before the operation of reducing the number of times to report radio resource management measurements is adopted, in the case of any measurement cycle (it should be understood that the measurement cycle may be any one of aforementioned first cycle ($T_{short}$), second cycle ($T_{long}$) third cycle ($T_{medium}$), and fourth cycle ($T_{exlong}$)) the terminal device 102 sends a measurement result to the base station 101 every time a measurement is performed. As an example, measurement results may be sent in a form of measurement report, and measurement results may include at least one of a measured reference signal received power (RSRP) value or a reference signal received quality (RSRQ) value of a serving cell or a neighboring cell. After adopting the operation of reducing the number of times to report measurements, as shown in 700B in FIG. 7, the terminal device 102 sends measurement results to the base station 101 once after performing measurement for multiple measurement cycles, and the measurement result is associated with all or part of the measurement results in the above multiple measurement cycles (e.g., associated with the measurement results of the most recent one or more of the multiple measurement cycles). It should be understood that the above operation for reducing the number of times to report measurements can be initiated in the following two ways: (1) the base station 101 sends a notification to the terminal device 102, so that the terminal device 102 sends one measurement report to the base station 101 every multiple measurement cycles; (2) the terminal device 102 itself decides to send one measurement report to the base station 101 after multiple measurement cycles according to its power consumption and other conditions.

In some embodiments of the present disclosure, in order to reduce power consumption of the terminal device, in addition to appropriately increasing and adjusting the size of the measurement cycle, the number of neighboring cells to be measured can also be reduced or the number of terminal devices performing measurement on neighboring cells can be reduced. It should be appreciated that the above two ways may be performed independently or in combination. Specific operations of the latter will be described in detail below.

Figure 8:
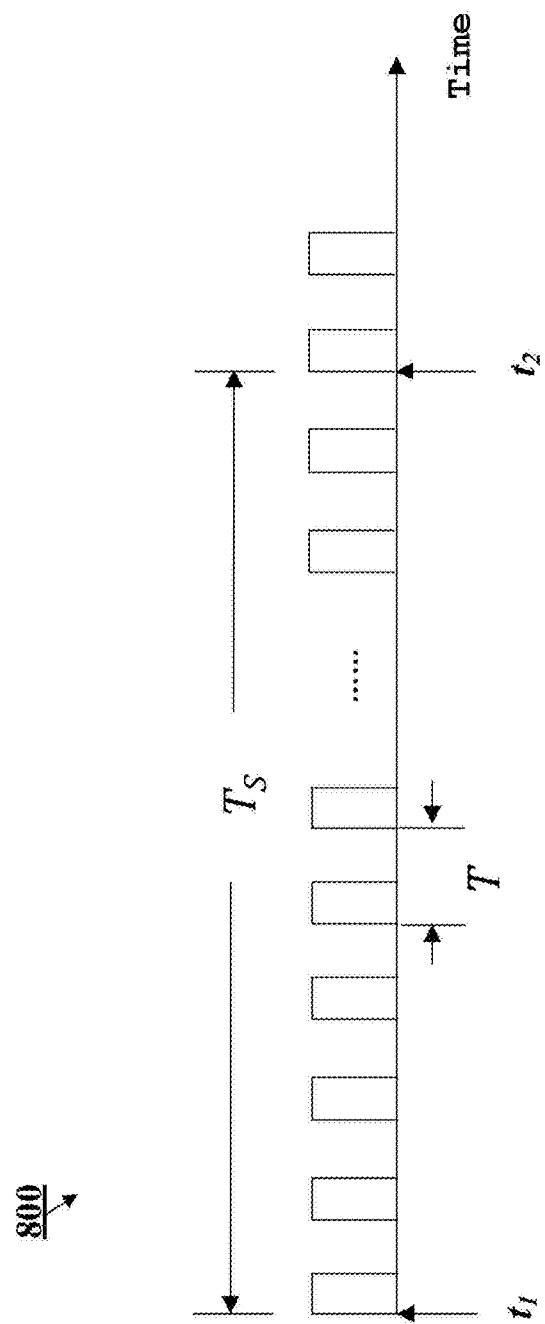
FIG. 8 illustrates an example schematic diagram of a cycle for performing overall cell measurement according to an embodiment of the present disclosure.

In an embodiment, the selection of which neighboring cells the terminal device will measure, or which terminal devices will be utilized to measure neighboring cells, may be based on the measurement results of the serving cell and neighboring cells. In other words, in order to ensure the effectiveness of the strategy, it is necessary to first obtain the information of measurement results of the measurements performed on respective cells by individual terminal devices. FIG. 8 illustrates an example schematic diagram 800 of a cycle for performing overall cell measurements according to an embodiment of the present disclosure.

Since the present disclosure is mainly aimed at scenarios where a terminal device is moving at a low speed, an overall measurement covering as many neighboring cells as possible can be performed in a relatively long cycle to obtain relevant a measurement result. This cycle is referred to herein as $T_S$ (which also sometimes is referred to herein as a fifth cycle), and the cycle $T_S$ is greater than any of above measurement cycles T. For example, $T_S$ can be an integer multiple of T. At the beginning of each cycle $T_S$, a plurality of terminal devices 102 may perform conventional radio resource management measurements (including serving cell measurements and overall neighboring cell measurements), and send measurement results to the base station 101. Based on this information, the base station 101 can use various algorithms to determine strategies to reduce the number of neighboring cells to be measured or to reduce the number of terminal devices measuring neighboring cells. It should be understood that, although moving speed of the terminal device is relatively low, long-term movement may still cause cell reselection/handover. Therefore, performing an overall cell measurement every long cycle $T_S$ can avoid, for example, that the original strategies are no longer applicable to current device distribution due to great variation in signal quality of neighboring cells.

The length of the cycle $T_s$ used for overall cell measurement may depend on moving speed of the terminal device. For example, in the present disclosure, simulation for locations of terminal devices in multiple cells is performed according to settings in Section A.2.1 of 3GPP TR 38.802. The minimum distance between Transmission Reception Points (TRPs) and cell radius of terminal devices are shown in Table 1 below.

TABLE 1

| Number of micro-TRPs in each macro-TRP | Minimum distance between micro-TRPs (unit: meter) | The radius R of the cell where terminal device is located (unit: meter) |
| --- | --- | --- |
| 3 | 40 | 50 |
| 6 | 32 | 50 |
| 9 | 25 | 50 |

According to above simulation results, it can be seen that a terminal device moved 50 meters may cause its cell to change. As an example, assuming a terminal device with a low movement rate of 3 km/h, the cycle $T_s$=50 m/(3 km/h) ≈60 s=300T (where T=200 ms, which is the cycle performing radio resource management measurements by a terminal device selected according to Section 5.3.1 of 3GPP TR 38.802). In each measurement cycle T, each terminal device may measure only some of its neighboring cells and send measurement results to a base station. Specific operations for causing a terminal device to perform measurements on a reduced number of neighboring cells will be described below in conjunction with FIG. 9 and FIG. 10.

Reduce the Number of Neighboring Cells to be Measured

Figure 9:
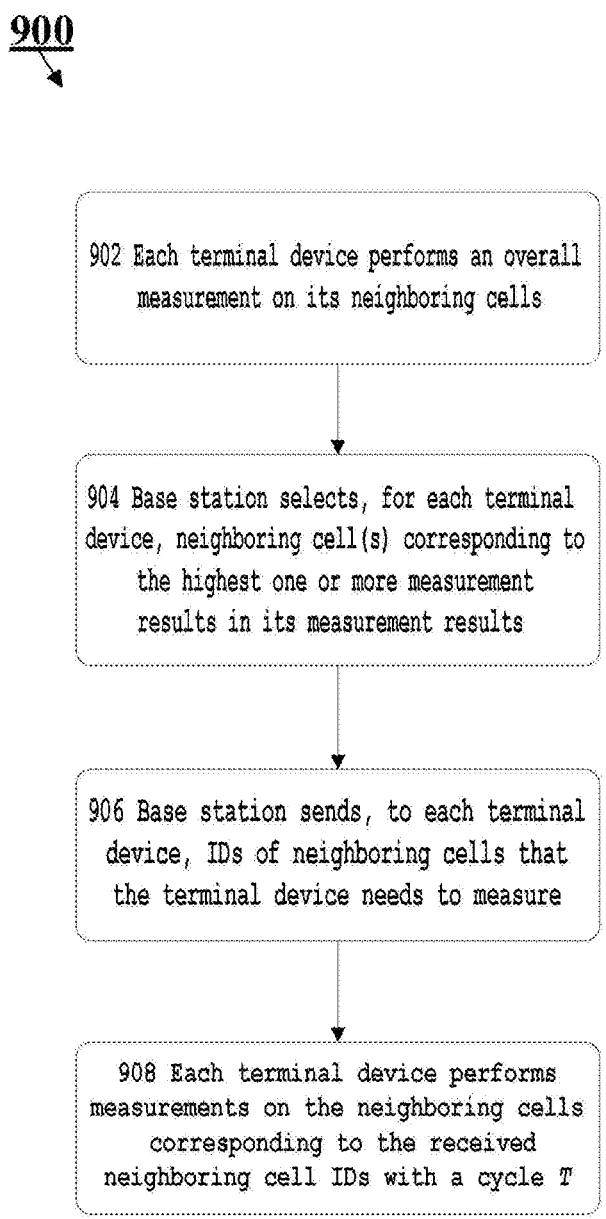
FIG. 9 illustrates a flowchart of an example method for a first example of reducing the number of neighboring cells to be measured according to an embodiment of the present disclosure.

FIG. 9 illustrates a flowchart of an example method 900 for a first example of reducing the number of neighboring cells to be measured according to an embodiment of the present disclosure. In the first example, selection of neighboring cells that each terminal device will measure is made from perspective of the terminal device.

As shown in FIG. 9, at the beginning of a cycle $T_S$, each terminal device performs an overall measurement on its neighboring cells (902). For example, neighboring cells to be measured may be neighboring cells that the terminal device can measure as many as possible. Referring back to FIG. 1, according to the scenario in the system 100, each of the terminal devices 102-a to 102-e may perform measurements on neighboring cells A-C and send measurement results to the base station 101. Table 2 below shows an example cell measurement result of the terminal device received by the base station, where the measurement result is an RSRP value (unit: dBm).

TABLE 2

| Neighboring cell A | | Neighboring cell B | | Neighboring cell C | |
|---|---|---|---|---|---|
| Terminal device ID | RSRP | Terminal device ID | RSRP | Terminal device ID | RSRP |
| 102-a | −115 dBm | 102-a | −117 dBm | 102-a | −92 dBm |
| 102-b | −105 dBm | 102-b | −95 dBm | 102-b | −104 dBm |
| 102-c | −120 dBm | 102-c | −110 dBm | 102-c | −108 dBm |
| 102-d | −106 dBm | 102-d | −100 dBm | 102-d | −112 dBm |
| 102-e | −111 dBm | 102-e | −106 dBm | 102-e | −111 dBm |

At 904, the base station selects, for each terminal device, neighboring cells that it will measure based on above measurement results. As an example, the base station may select, for each terminal device, one or more neighboring cells corresponding to the highest one or more measurement results in its measurement results. Assuming that the number of neighboring cells selected for measurement is 2, according to Table 2, for the terminal device 102-a, the measurement results for neighboring cells C and B are the highest among its measured neighboring cells. Therefore, it is determined that the terminal device 102-a will only measure neighboring cells C and B in the following plurality of cycles T, instead of neighboring cell A. Additionally or alternatively, the base station may also select, for each terminal device, neighboring cells corresponding to measurement results exceeding a certain threshold in its measurement results. Assuming that the certain threshold is −110 dBm, according to Table 2, only the measurement result of the terminal device 102-a on the neighboring cell C is greater than the threshold, so it is determined that the terminal device 102-a will only measure neighboring cell C in the following plurality of cycles T. In the latter case, optionally, if the number of neighboring cells satisfying measurement results being greater than the certain threshold is too many, one or more cells with the largest measurement results can be further selected for measurement for the purpose of saving power consumption of the terminal device. After determining which neighboring cell (or cells) each terminal device will measure, at 906, the base station sends to each terminal device identifier(s) (ID(s)) of corresponding neighboring cell(s) that the terminal device needs to measure. Accordingly, the terminal device performs measurements with a cycle T on the neighboring cell (s) corresponding to the received neighboring cell ID (s) (908). After that, it can be determined whether the next cycle $T_S$ is entered. If yes, it can go back to 902 to perform an overall measurement on neighboring cells again, otherwise it can go back to 908, that is, to perform measurements on a reduced number of neighboring cells with a short cycle T in a long cycle $T_{S'}$.

It should be understood that the base station may notify each terminal device of IDs of neighboring cells that needs to be measured through RRC signaling. As an example, according to 3GPP TS38.331, the RRC signaling can reserve only IDs of neighboring cells that needs to be measured in the field physCellId, whose description is as follows:

| CellsToAddMod field description |
|---|
| physCellId Physical cell IDs in the cell list |

Figure 10:
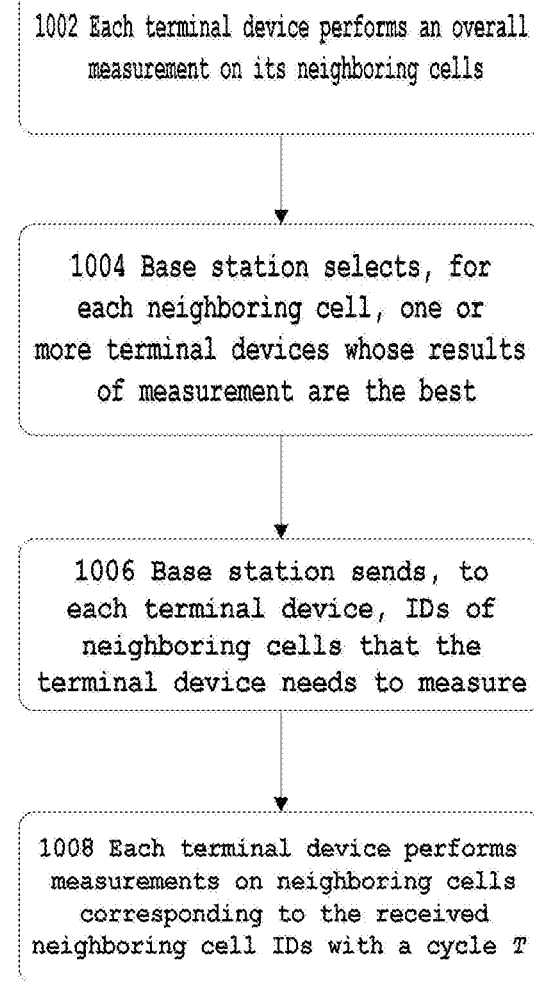
FIG. 10 illustrates a flowchart of an example method for a second example of reducing the number of neighboring cells to be measured according to an embodiment of the present disclosure.

In addition to selecting a reduced number of neighboring cells for measurement from the perspective of a terminal device shown in FIG. 9, the number of cells to be measured can also be reduced from the perspective of neighboring cells to reach the purpose of reducing power consumption of the terminal device. FIG. 10 illustrates a flowchart of an example method 1000 for a second example of reducing the number of neighboring cells to be measured according to an embodiment of the present disclosure. In the second example, the selection of which neighboring cells each terminal device will measure is made from the perspective of the neighboring cells.

As shown in FIG. 10, at the beginning of a cycle $T_S$, each terminal device performs an overall measurement on its neighboring cells (1002). For example, neighboring cells to be measured may be neighboring cells that the terminal device can measure as many as possible. Referring back to FIG. 1, according to the scenario in the system 100, each of the terminal devices 102-a to 102-e performs measurements on neighboring cells A-C and send measurement results to the base station 101. Next, at 1004, the base station selects, for each of the neighboring cells (e.g., neighboring cells A-C), one or more terminal devices whose results of measurement on the neighboring cell are the best. In other words, for each neighboring cell, the measurement results of the selected one or more terminal devices on the neighboring cell are the highest one or more measurement results for the neighboring cell. Generally speaking, the one or more terminal devices are physically close to the above neighboring cell, and therefore have a higher possibility of moving into the coverage of the neighboring cell. Referring to Table 2, as an example, assuming that 2 neighboring cells with the highest measurement result values are selected for each neighboring cell, then for neighboring cell A, the two terminal devices with the highest measurement results are 102-b and 102-d; for the neighboring cell B, the two terminal devices with the highest measurement results are 102-b and 102-d respectively; for the neighboring cell C, the two terminal devices with the highest measurement results are 102-a and 102-b respectively. Optionally, when one terminal device needs to measure too many neighboring cells, for example, in the above example, the terminal device 102-a needs to measure neighboring cells A, B, and C. In this case, the terminal device 102-a can further select to measure only a portion of neighboring cells. For example, it can be specified that the number of this portion of neighboring cells does not exceed a certain threshold. For example, the terminal device 102a further select to measure only neighboring cells B and C (i.e., the above contain threshold is 2). Therefore, for the neighboring cell A, it may be considered to select the terminal device 102-e ranked the third highest in the measurement result values to measure the neighboring cell A in subsequent cycle T. Alternatively or additionally, if one neighboring cell is far away from all terminal devices, i.e. all measurement results for the neighboring cell have low values, a low threshold $S_{Out}$ can be set. When the best measurement result for the neighboring cell is lower than the threshold $S_{Out}$, no terminal device may be selected for measurement. This is because there is no terminal devices close to the cell, so the terminal devices are unlikely to move into the coverage of the neighboring cell and require cell reselection/handover.

Steps of the second example are similar to those of the first example after determining terminal devices for each neighboring cell. Specifically, at 1006, the base station sends, to each terminal device, IDs of neighboring cells that the terminal device needs to measure. As described above, the base station can notify each terminal device of IDs of neighboring cells that needs to be measured through RRC signaling. As an example, this can be achieved by reserving only IDs of neighboring cells that need to be measured in the field physCellId in the RRC signaling. Accordingly, the terminal device performs measurements on neighboring cells corresponding to the received neighboring cell IDs with a cycle T (1008). After that, it can be determined whether the next cycle $T_S$ is entered. If yes, it can go back to 1002 to perform an overall measurement on neighboring cells again, otherwise it can go back to 1008, that is, to perform measurements on a reduced number of neighboring cells with a short cycle T in a long cycle $T_S$.

As mentioned before, the measurement cycle relaxation mechanism can be performed independently from reducing the number of neighboring cells to be measured, or they can be performed in combination. Optionally, in a case that a reduced number of neighboring cells are selected for measurement from the perspective of neighboring cells, terminal devices selected to measure neighboring cells may be instructed to perform neighboring cells measurement with a fixed shorter cycle (e.g., a first cycle ($T_{short}$)), while terminal devices not selected to measure any neighboring cells can use the measurement cycle relaxation mechanism, that is, dynamically adjust their measurement cycles according to fluctuation levels of measurement results. This is because the selected terminal devices are closer to neighboring cells and needs to measure neighboring cells more frequently in order to perform cell reselection/handover in time, while the unselected terminal devices are relatively far from neighboring cells, and they are unlikely to enter the coverage of neighboring cells in a short time, so the overall average measurement cycles may be appropriately increased to reduce power consumption of terminal devices.

Reduce the Number of Terminal Devices Measuring Neighboring Cells

Referring back to FIG. 8, in each measurement cycle T, in addition to reducing the number of neighboring cells that each terminal device needs to measure as mentioned above, it is also possible to select only some terminal devices in a serving cell to perform neighboring cell measurements and report the measurement results to abase station so as to reduce power consumption of terminal devices. In other words, all terminal devices can be divided into multiple terminal device groups, and for at least one terminal device group, only one or more terminal devices (instead of all terminal devices) in that terminal device group are selected to perform neighboring cell measurements. The above specific operation of reducing the number of terminal devices performing measurement on neighboring cells will be described below in conjunction with FIG. 11A and FIG. 11B.

Figure 11A:
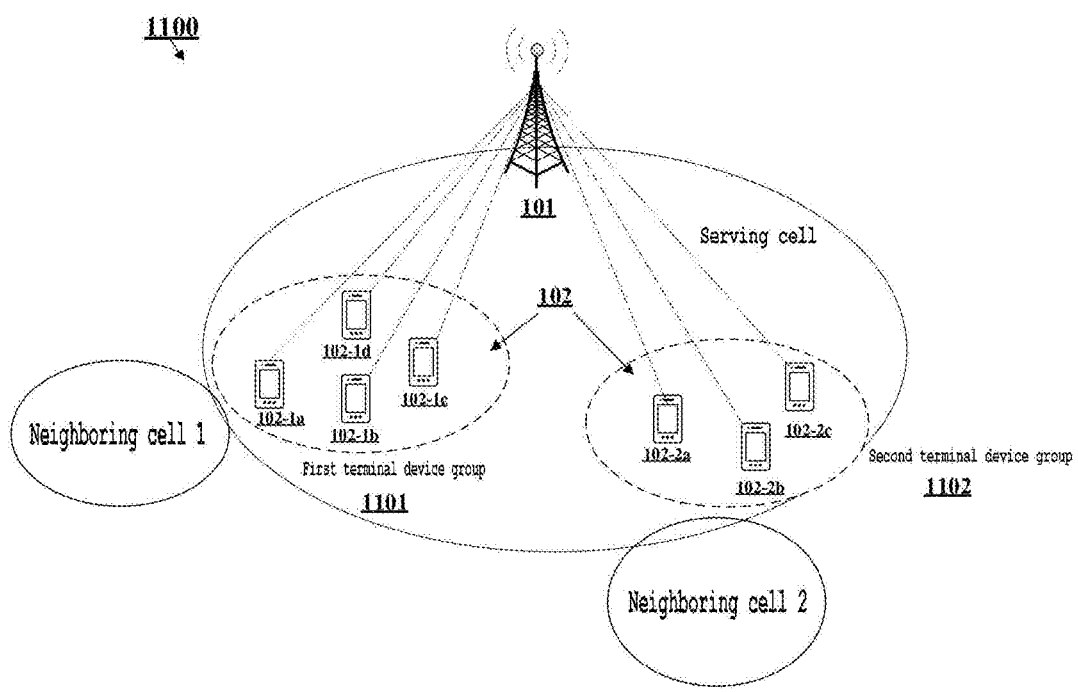
FIGS. 11A and 11B respectively illustrate an example scenario diagram and an example interaction diagram for reducing the number of terminal devices measuring neighboring cells according to an embodiment of the present disclosure.

FIG. 11A illustrates an example scenario diagram for reducing the number of terminal devices measuring neighboring cells according to an embodiment of the present disclosure. As shown in FIG. 11A, the system 1100 includes a serving cell and two neighboring cells (i.e., neighboring cell 1 and neighboring cell 2). A base station 101 and a plurality of terminal devices 102 are included in the serving cell. In this example, the terminal devices are divided into 2 different terminal device groups: a first terminal device group 1101 (including terminal devices 102-1a to 102-1d) and a second terminal device group 1102 (including terminal device 102-2a to 102-2c). As an example, the division of terminal devices may be based on geographic areas, i.e., multiple terminal devices located in the same smaller geographic area within a serving cell may be divided into one terminal device group.

After dividing terminal device groups, the base station will select one or more terminal device (also referred to herein as "representative terminal devices") for each terminal device group to replace all terminal devices in the terminal device group to perform neighboring cell measurements. Meanwhile, other terminal devices in terminal device groups other than representative terminal devices may perform only serving cell measurements without performing any neighboring cell measurements. As an example, representative terminal device (s) may be one or more terminal devices with the lowest values of serving cell measurement results in a terminal device group where the representative terminal device(s) is(are) located. In other words, terminal devices in one terminal device group that are close to the edge of the serving cell and close to neighboring cells usually have low serving cell measurement results and are most likely to move into the coverage of neighboring cells, thus requiring cell reselection/handover. Therefore, selecting representative terminal devices to perform neighboring cell measurements can not only reduce the average power consumption of terminal devices, but also can ensure the accuracy and validity of neighboring cell measurements. As an example, for the first terminal device group 1101, terminal device 102-1a may be selected as its representative terminal device; for the second terminal device group 1102, terminal device 102-2b may be selected as its representative terminal device. As can be seen from FIG. 11A, the representative terminal device 102-1a is the terminal device closest to the neighboring cell 1 in the first terminal device group; and the representative terminal device 102-2b is the terminal device closest to the neighboring cell 2 in the second terminal device group.

Optionally, when a serving cell measurement result of one terminal device is high (e.g., higher than a threshold $S_{measure}$ that does not need to perform neighboring cell measurements), it indicates that the device is far away from any neighboring cells, so the possibility of moving into the coverage of a neighboring cell is low, so the terminal device may not be grouped or (if the terminal device has already been grouped) may be removed from the terminal device group to which it belongs. Optionally, when a serving cell measurement result of one terminal device is very low (for example, it is lower than a serving cell measurement result threshold $S_{relax}$ when the terminal device is at the edge of the serving cell, where $S_{relax} < S_{measure}$), the terminal device may not be grouped or (if the terminal device has already been grouped) may be removed from the terminal device group to which it belongs. This is because the terminal device is far away from the base station of the serving cell, so it needs to pay attention to its own measurement results for neighboring cells, and is not suitable for performing neighboring cell measurements on behalf of a terminal device group, that is, it is not representative, so the terminal device may not be grouped.

Figure 11B:
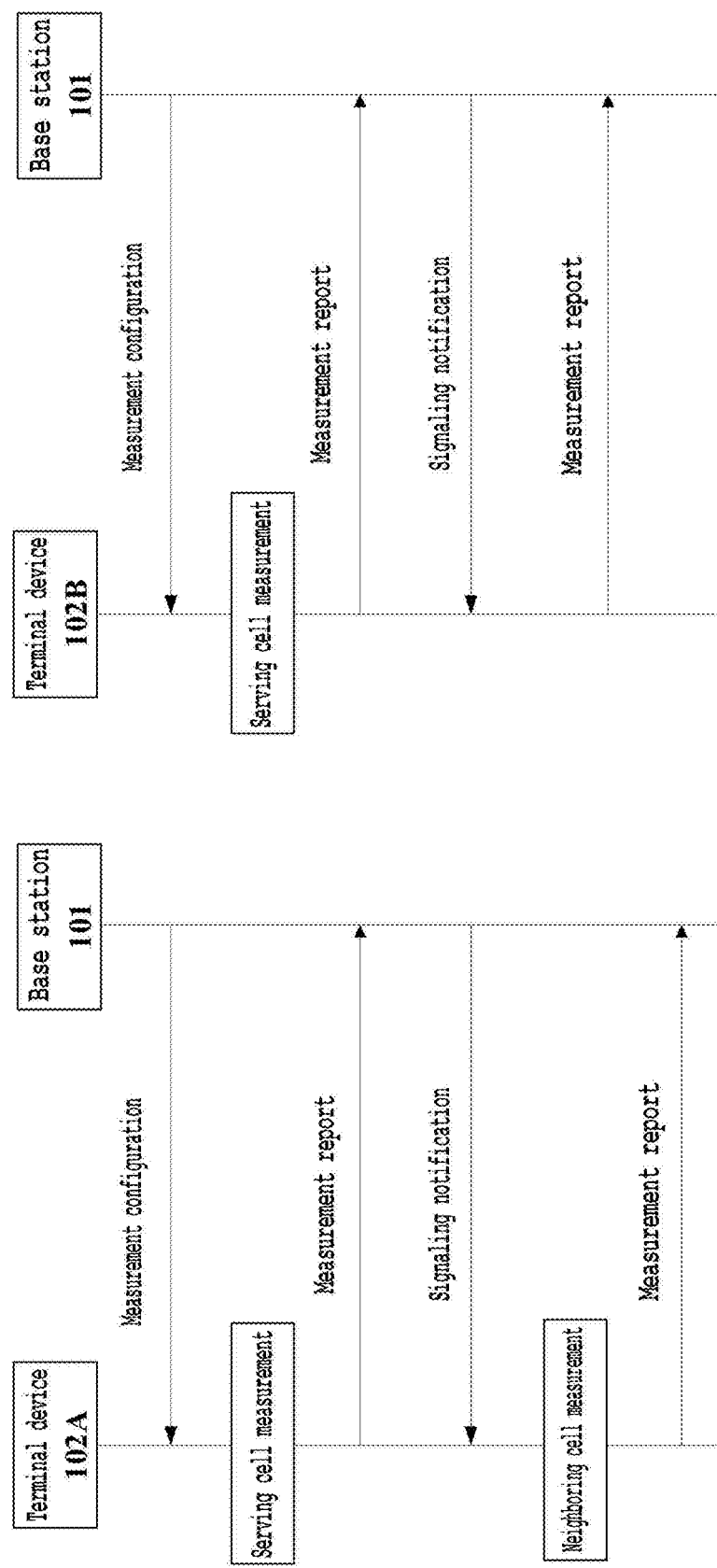

Accordingly, FIG. 11B illustrates an example interaction diagram for reducing the number of terminal devices measuring neighboring cells according to an embodiment of the present disclosure. As shown in FIG. 11B, 1100'A illustrates a signaling interaction diagram between the representative terminal device 102A and the base station 101, and 1100'B illustrates a signaling interaction diagram between other terminal device 102B in the same terminal device group and the base station 101.

As indicated at 1100'A, for representative terminal device 102A, it first receives measurement configuration parameters from base station 101. As an example, the measurement configuration parameters may include above thresholds $S_{measure}$, $S_{relax}$, and the like. At the beginning of a long cycle $T_S$, the terminal device 102A performs serving cell measurements and sends serving cell measurement results (e.g., in the form of measurement reports) to the base station 101. The base station 101 then signals to the terminal device 102A that it can act as a representative terminal device in the terminal device group to which it belongs, and indicates that it can perform neighboring cell measurements. Accordingly, the representative terminal device 102 may perform neighboring cell measurements with a cycle T, and send neighboring cell measurement results (e.g., in the form of measurement reports) to the base station 101. It should be understood that, at the beginning of the long cycle $T_S$, if the base station 101 determines that the serving cell measurement result of the terminal device 102A is higher than the threshold $S_{measure}$ or lower than the threshold $S_{relax}$, the terminal device 102A can be removed from the terminal device group to which it belongs, and interrupts all subsequent operations. As shown in 1100'B, for other terminal devices 102B in the terminal device group other than the representative terminal device 102A, their interaction with the base station 101 is similar to the interaction between the representative terminal device 102A and the base station 101. The main difference between the two is that after receiving the serving cell measurement result of the terminal device 102B, the base station 101 signals to the terminal device 102B that it may act as a non-representative terminal device (i.e. other terminal device) in the terminal device group to which it belongs, and instructs it not to perform neighboring cell measurement and only perform serving cell measurements. Accordingly, the other terminal device 102B continues to perform serving cell measurements, and sends measurement results to the base station 101.

SIGNALING EXAMPLE

Several signaling examples in embodiments of the present disclosure will be described below.

In one embodiment, when the base station 101 sends an indication of enabling a measurement cycle relaxation mechanism (or disabling a measurement cycle relaxation mechanism) to the terminal device 102, the indication may be achieved through one or more bits in a Radio Resource Control (RRC) Information Element (IE). As an example, a binary variable MeasCycleRelaxSet can be designed in the MeasConfig field in the RRC IE to indicate whether the terminal device 102 enables a measurement cycle relaxation mechanism, as shown below:

```
-- ASN1START
-- TAG-MEASCONFIG-START
MeasConfig ::=              SEQUENCE {
MeasCycleRelaxSet ::=       INTEGER (0..1)
    ...
}
-- TAG-MEASCONFIG-STOP
-- ASN1STOP
```

By setting the binary variable MeasCycleRelaxSet to 1, the terminal device 102 can be instructed to enable the measurement cycle relaxation mechanism, otherwise when MeasCycleRelaxSet is set to 0, the measurement cycle relaxation mechanism is disabled, i.e. the measurement cycle remains at a default value.

In another embodiment, in scenarios of reducing the number of terminal devices performing measurements on neighboring cells, the base station 101 sends an indication to terminal devices within a terminal device group regarding whether the terminal devices acts as representative terminal devices to measure neighboring cells, and the indication can be implemented by, for example, the following two signaling forms:

(1) [DCI Format 1_1]:

In this example, the indication to measure neighboring cells sent by the base station 101 to the terminal device 102 can be achieved through one or more bits in downlink control information (DCI). According to Section 7.3.1.2.2 of 3GPP TS 38.212, the New Data Indicator (NDI) field in the DCI is used to indicate whether the current Code Block Group (CBG) is new transmitted or retransmitted data. When NDI indicates retransmission data, Code Block Group Transmission Information (CBGTI) is configured in a higher layer to be 2, 4, 6 or 8 bits to represent retransmission information. When NDI indicates new transmission data, there is no retransmission data, so the Code Block Group Transmission Information (CBGTI) is empty and meaningless (it can also be understood as not occupying any useful bits). Therefore, in this example, when the NDI indicates new transmission data, the CBGTI can be set to 1 bit through a higher layer configuration, and this bit is used to indicate whether a terminal device needs to perform neighboring cell measurements as a representative terminal device in a terminal device group.

(2) [RRC Configuration Information Element (RRC Configuration-IE)]

In this example, the indication to measure neighboring cells sent by that the base station 101 to the terminal device 102 can be achieved through one or more bits in a Radio Resource Control (RRC) configuration Information Element (IE). As an example, a binary variable MeasNeighborCellSet can be designed in the RRC Configuration-IE to indicate whether the terminal device performs a neighboring cell measurement MeasCycleRelaxSet, as shown below:

```
-- ASN1START
-- TAG-MEASCONFIG-START
MeasConfig ::=              SEQUENCE {
MeasNeighborCellSet ::=     INTEGER (0..1)
    ...
}
-- TAG-MEASCONFIG-STOP
-- ASN1STOP
```

According to above description, it can be defined that if the value of MeasNeighborCellSet is 1, the corresponding terminal device will perform neighboring cell measurements as a representative terminal device in the terminal device group; otherwise, when the value of MeasNeighborCellSet is 0, the corresponding terminal device will only perform service cell measurements without performing neighboring cell measurements.

Exemplary Method

Figure 12:
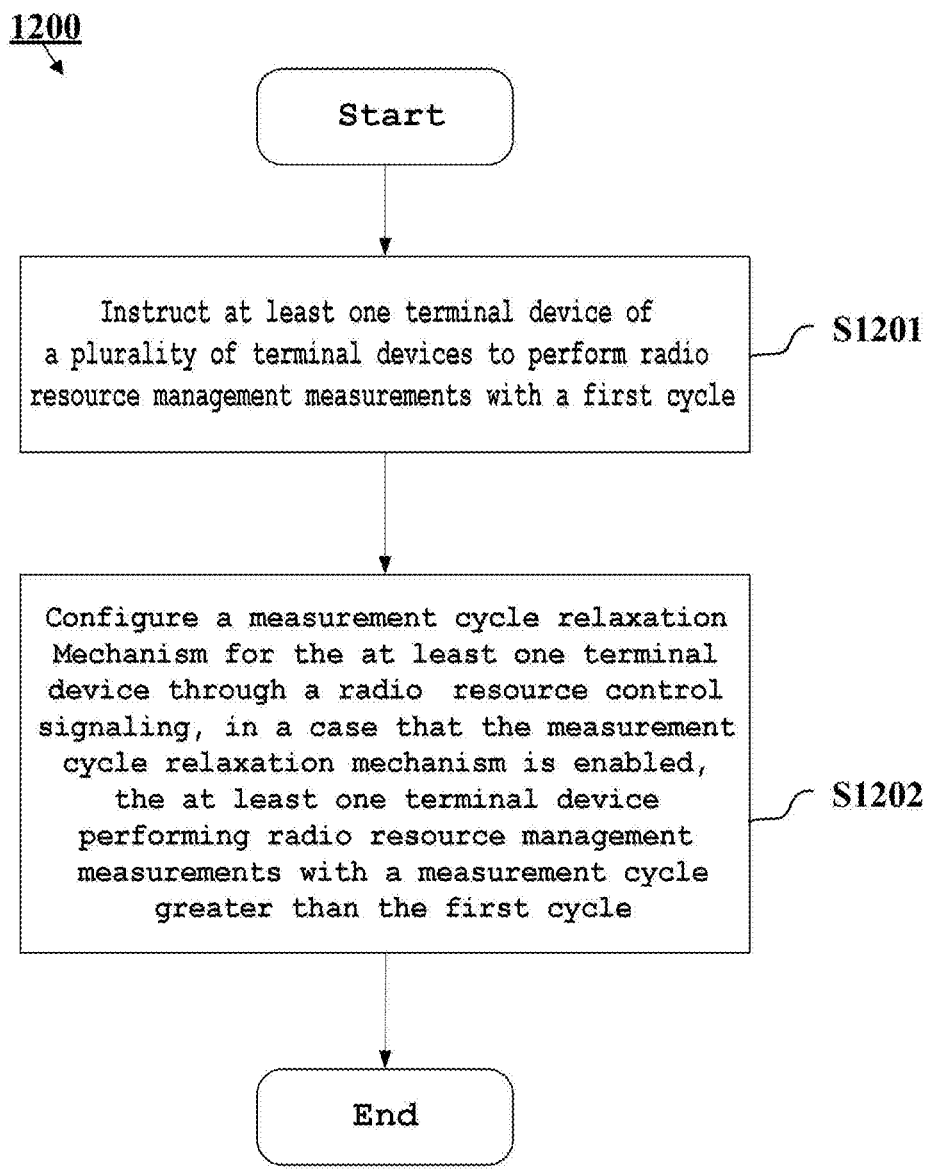
FIGS. 12 to 13 illustrate flowcharts of example methods for radio resource management measurements according to embodiments of the present disclosure.

FIG. 12 illustrates an example method for a base station according to an embodiment of the present disclosure. The method may be performed by the base station 101 or the electronic device 200 in the system 100. As shown in FIG. 12, the method 1200 may include instructing at least one terminal device of a plurality of terminal devices to perform radio resource management measurements with a first cycle, wherein the base station provides a serving cell for the plurality of terminal devices, and the radio resource management measurements include serving cell measurements and neighboring cell measurements (block 1201). The method may further include configuring a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle (block 1202). For detailed example operations of the method, reference may be made to above description of operations of the base station 101 or the electronic device 200, which will not be repeated here.

Figure 13:
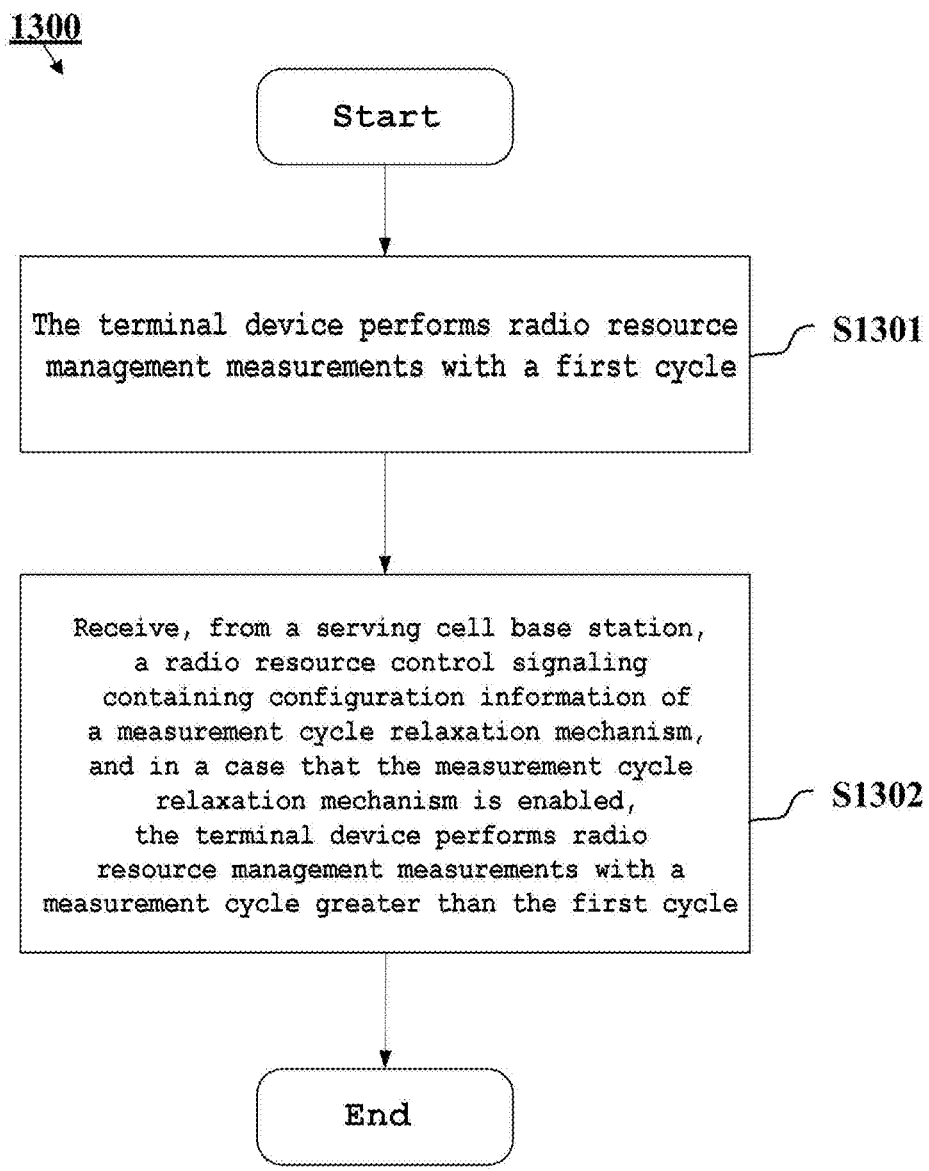

FIG. 13 illustrates an example method for a terminal device according to an embodiment of the present disclosure. The method 1300 may be performed by the terminal device 102 or the electronic device 300 in the system 100. As shown in FIG. 13, the method 1300 may include the terminal device performing radio resource management measurements including serving cell measurements and neighboring cell measurements with a first cycle (block 1301). The method 1300 may further include receiving, from a serving cell base station, a radio resource control signaling containing configuration information of a measurement cycle relaxation mechanism, and in a case that the measurement cycle relaxation mechanism is enabled, the terminal device performing radio resource management measurements with a measurement cycle greater than the first cycle (block 1302). For detailed example operations of the method, reference may be made to above description of operations of the terminal device 102 or the electronic device 300, which will not be repeated here.

Benefits of this Disclosure

In summary, according to the embodiments of the present disclosure, adapting a measurement cycle relaxation mechanism and determining the fluctuation levels and/or values of radio resource management measurement results of terminal devices by a base station or a terminal device and appropriately adjusting measurement cycles based on the fluctuation levels and/or values can achieve the effect of increasing the average measurement cycle as a whole, thereby reducing power consumption of terminal devices. At the same time, the measurement cycle relaxation mechanism may also appropriately reduce measurement cycles based on a large variation in the fluctuation level of a measurement result and/or when the value of the measurement result is small, so as to ensure the accuracy and validity of the measurement. In addition, according to another embodiment of the present disclosure, the measurement relaxation mechanism can also reduce the number of times that the terminal device sends measurement reports to the base station device in any measurement cycle, so as to further reduce energy consumption of the terminal device. On this basis, the total number of measurements can also be reduced by reducing the number of neighboring cells to be measured or the number of terminals that measure neighboring cells. This solution can be performed individually or in combination with the measurement cycle relaxation mechanism, so as to achieve more optimized energy saving purpose.

Figure 14:
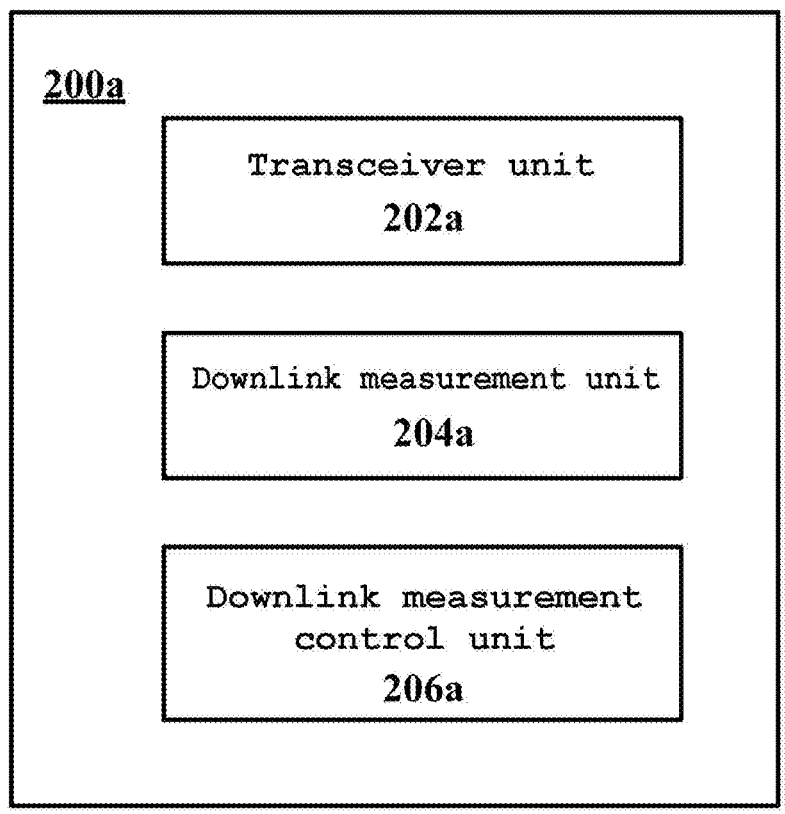
FIG. 14 illustrates an example electronic device for a terminal device according to an embodiment of the present disclosure.

FIG. 14 illustrates an exemplary electronic device 200a for the terminal device 102 in the system 100 according to an embodiment of the present disclosure. The electronic device 200a shown in FIG. 14 may include various units to implement various embodiments for downlink measurements according to the present disclosure. In this example, the electronic device 200a includes a transceiver unit 202a, a downlink measurement unit 204a, and a downlink measurement control unit 206a. In one implementation, the electronic device 200a is implemented as the terminal device 102 itself or a part thereof, or as a device for controlling the terminal device 102 or otherwise associated to the terminal device 102 or as a part thereof. Various operations described below in conjunction with the terminal device can be implemented by the units 202a to 206a or other possible units of the electronic device 200a.

In an embodiment, the downlink measurement unit 204a may be configured to perform downlink measurements during measurement occasions in one or more DRX cycles. The measurement occasions may correspond to specific time-frequency resources and may be configured at one or more specific locations in the DRX cycle. Measurements may include at least one of RLM or BFD. These time-frequency resources may be used to transmit, for example, downlink reference signals or synchronization signals for at least one of RLM or BFD.

In an embodiment, the downlink measurement control unit 206a may be configured to determine subsequent operations of the terminal device 102 based on a comparison of downlink quality values obtained by a certain number of measurements with one or more thresholds. The subsequent operations may include at least the terminal device 102 not performing downlink measurements at a subsequent certain period of time or during measurement occasions of a certain number of subsequent DRX cycles, or the terminal device 102 waking up.

The transceiver unit 202a may be configured to transmit signals to or receive signals from the base station 101 in the system 100. For example, the transceiver unit 202a may receive control signaling (e.g., RRC signaling) from the base station 101 including configuration information for controlling downlink measurements. The configuration information may include various parameters such as number of measurements, duration, timer values, quality thresholds, etc., as described in detail below.

In some embodiments, the electronic device 200a can be implemented at the chip level, or may also be implemented at the device level by including other external components (e.g., radio links, antennas, etc.). For example, the electronic device 200a may function as a communication device as a whole.

It should be noted that the above units are only logical modules divided according to the specific functions they implement, and are not used to limit specific implementations. For example, they can be implemented in software, hardware, or a combination of software and hardware. The specific implementation of the electronic device 200a can be understood with reference to the descriptions about the electronic devices 200 and 300, which will not be repeated here.

Downlink Measurement Mechanism

Generally, a terminal device may perform downlink measurements and report measurement results to a base station. Downlink measurements may be for measurement signals such as reference signals and synchronization signals. In the case of poor measurement results, base stations or terminal devices can adjust resources (such as time-frequency, power, beam and other resources) to keep downlink stable and reliable. Therefore, downlink measurements are necessary to ensure communication quality. However, the reception of measurement signals requires an increase in power consumption of a terminal device.

Figure 15A:
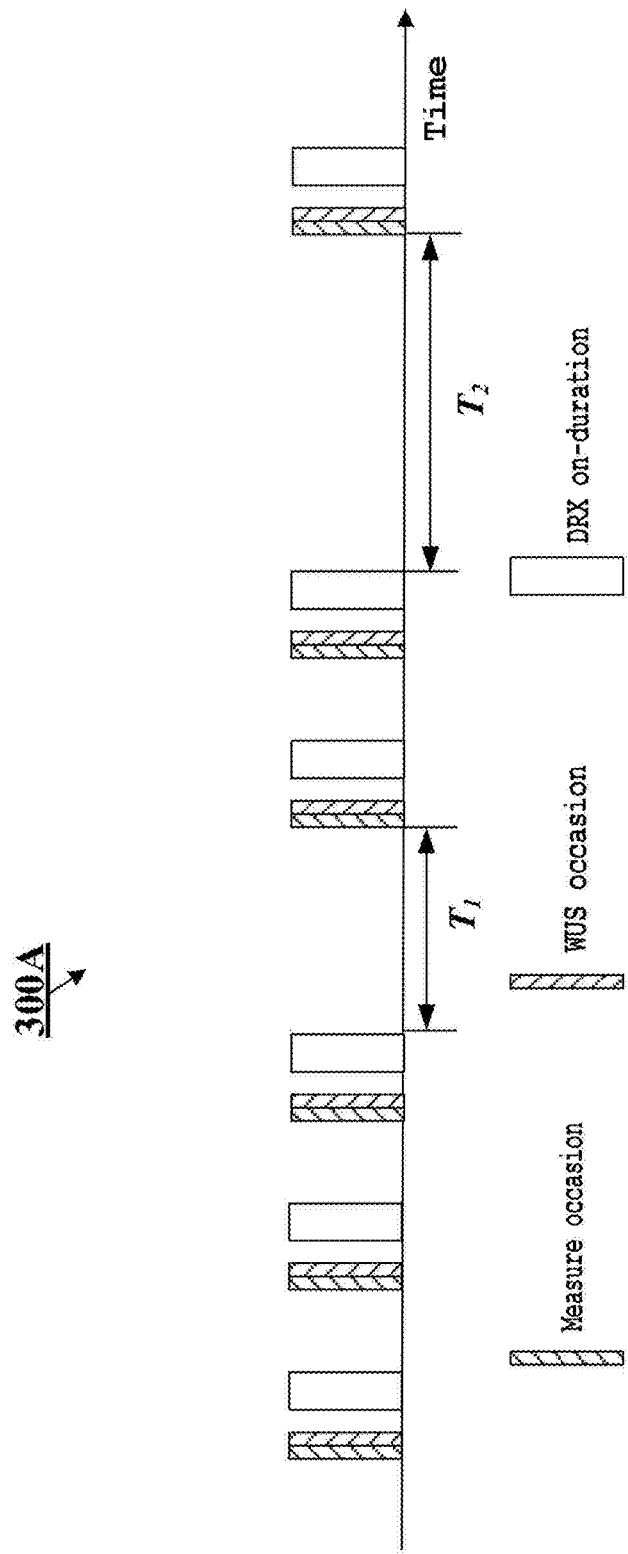
FIG. 15A illustrates a schematic diagram of a first example of downlink measurement according to an embodiment of the present disclosure.

In this disclosure, a downlink measurement mechanism can control a terminal device to reduce the number of measurements under certain conditions, aiming to balance the power consumption of the terminal device and the stability and reliability of the downlink. FIG. 15A illustrates a first example schematic diagram 300A of downlink measurements according to an embodiment of the present disclosure.

As shown in FIG. 15A, an terminal device (e.g., 102) may perform different operations over time. Specifically, during the on-duration of a DRX cycle, the terminal device 102 may listen to a control channel (e.g., PDCCH) from the base station 101. If no message is listened over the control channel during the on-duration, the terminal device 102 may go into sleep after the end of the on-duration; otherwise, the terminal device 102 may remain in a receiving state to further communicate with the base station 101 based on the listened message. In a 5G NR system, the DRX on-duration can be set to, for example, 2 ms, 4 ms, 8 ms, 10 ms, 16 ms, 64 ms, 256 ms, etc.

To enable the terminal device 102 to perform downlink measurements, measurement occasions may be configured in the DRX cycle, as shown in FIG. 15A. The measurement occasions may correspond to specific time-frequency resources. The terminal device 102 may receive measurement signals (including but not limited to reference signals and synchronization signals) sent by the base station 101 during measurement occasions to obtain downlink measurement values. Downlink measurements may include at least one of RLM or BFD. In a 5G NR system, measurement signals may include RLM-RS, CSI-RS, SSB, etc. Measurement occasions may be shifted forward by a certain time from the DRX on-duration, so that measurement reports can be sent to the base station during the subsequent DRX on-duration. As an example, the shifted time may be, for example, less than ten milliseconds, ten to twenty milliseconds, or tens of milliseconds.

Optionally, a Wake-Up Signal (WUS) occasion may be configured in a DRX cycle, as shown in FIG. 15A. During a WUS occasion, the terminal device 102 may listen for WUS over a control channel (e.g., PDCCH). If a WUS is listened over the control channel during the WUS occasion, the terminal device 102 may listen to the control channel during the immediately following on-duration; otherwise, the terminal device 102 may not listen to the control channel during the on-duration but remain asleep. In a 5G NR system, the WUS occasion can be shifted forward by a certain amount of time, such as a few milliseconds, from the DRX on-duration.

In the present disclosure, the terminal device 102 may perform downlink measurements during measurement occasions of one or more DRX cycles, and determine subsequent operations of the terminal device 102 based on a comparison of downlink quality values obtained by a certain number of measurements with one or more thresholds. In an embodiment, subsequent operations include at least that: the terminal device 102 may not perform downlink measurements at a subsequent certain period of time or during measurement occasions of a certain number of subsequent DRX cycles, or the terminal device 102 may wake up.

In one embodiment, it may be determined that the terminal device 102 does not perform downlink measurements at a subsequent certain period of time or during measurement occasions of a certain number of subsequent DRX cycles based on each downlink quality value obtained through a first number of measurements being better than a first threshold. Here, the first threshold may correspond to a measurement quality level at which the downlink is received with higher reliability. For example, the first threshold may correspond to $Q_{in}$ in the 5G NR standard. As an example, the first number may be 3, 4, 5, etc.

As shown in FIG. 15A, during the three measurement occasions on the left, the downlink quality may each be better than the first threshold. Accordingly, the terminal device 102 may stop performing downlink measurements during subsequent time $T_1$ or measurement occasions of a corresponding number of DRX cycles to reduce power consumption associated with receiving measurement signals. It should be understood that a certain number of downlink quality values being better than the first threshold may reflect the stable state of the downlink. Therefore, it can be considered that the stop of performing downlink measurements for immediate period of time does not adversely affect downlink communications.

In one embodiment, it may be determined that the terminal device 102 will not perform downlink measurements at a subsequent certain period of time or during measurement occasions of a certain number of subsequent DRX cycles based on downlink quality values obtained through a second number of measurements being better than the first threshold and based on the downlink quality history. The downlink quality history may indicate that previously obtained downlink quality values are better than the first threshold, and the second number may be less than the first number. As an example, the second number may be 2, 3, 4, etc.

As shown in FIG. 15A, during the middle 2 measurement occasions, the downlink quality may both be better than the first threshold. Accordingly, the terminal device 102 may stop performing downlink measurements during subsequent time $T_2$ or measurement occasions of a corresponding number of DRX cycles to reduce power consumption associated with receiving measurement signals and may not adversely affect downlink communications. In this case, considering that the multiple downlink measurement values before $T_1$ are all better than the first threshold, therefore the terminal device 102 may be put into sleep just based on a small number of measurements that satisfy the threshold condition. It is understood that in this embodiment, power consumption of the terminal device 102 associated with receiving measurement signals may be further reduced based on a history of better downlink quality. In one embodiment, $T_2$ may be greater than $T_1$ to achieve better energy saving effect; however, it is also feasible that $T_2$ is less than or equal to $T_1$.

Figure 15B:
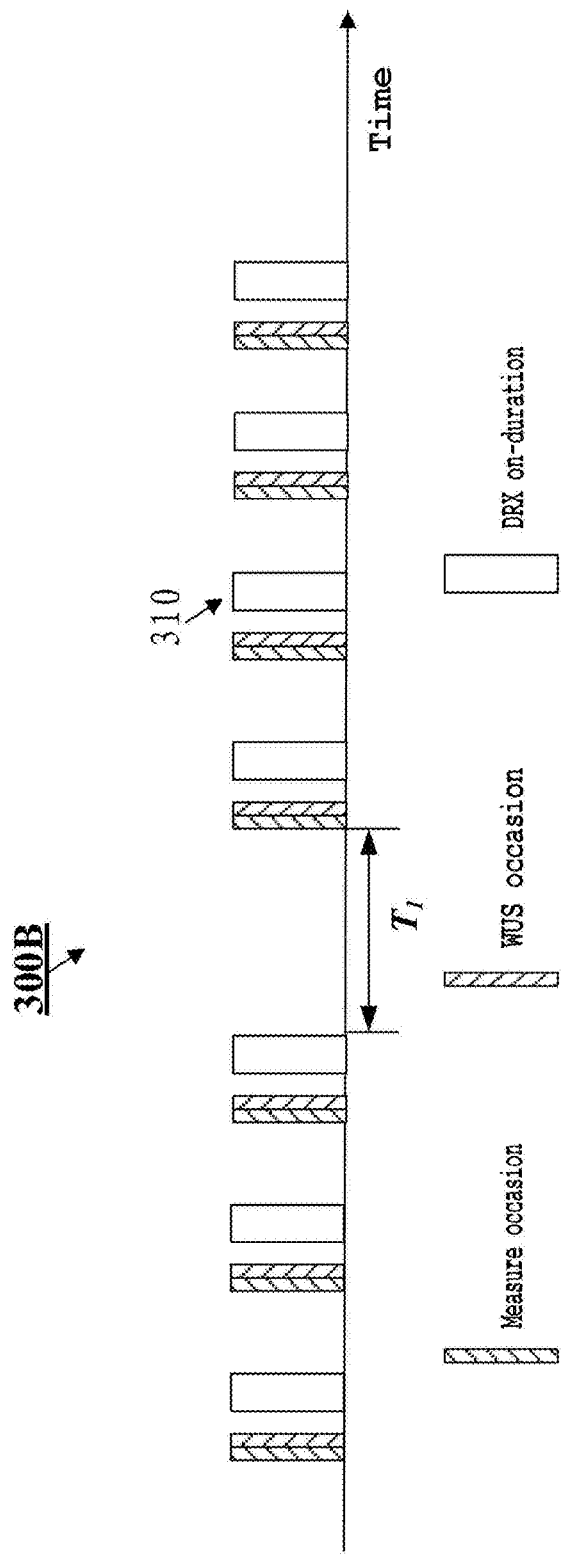
FIG. 15B illustrates a schematic diagram of a second example of downlink measurement according to an embodiment of the present disclosure.

FIG. 15B illustrates a second example schematic diagram 300B of downlink measurements according to an embodiment of the present disclosure.

In one embodiment, it may be determined that the terminal device 102 resumes normal performance of downlink measurements during measurement occasions of subsequent DRX cycles based on downlink quality values obtained by a third number of measurements being worse than the first threshold and better than the second threshold. Here, the second threshold may correspond to a measurement quality level at which the downlink cannot be reliably received. For example, the second threshold may correspond to $Q_{out}$ in the 5G NR standard. As an example, the third number may be 1, 2, 3, etc.

As shown in FIG. 15B, after the time $T_1$ described in conjunction with FIG. 15A has elapsed, downlink quality values obtained during the DRX on-duration 310 are worse than the first threshold and better than the second threshold. Accordingly, the terminal device 102 can resume performing downlink measurements during subsequent measurement occasions until the measurement results trigger other subsequent operations. In this embodiment, the condition that is worse than the first threshold and better than the second threshold reflects a state in which the link quality has just started to deteriorate. At this time, restoring to normal downlink measurements can help the terminal device to obtain current link quality immediately, so that the base station or the terminal device can perform resource adjustment in time in case that the link quality continues to deteriorate.

Figure 15C:
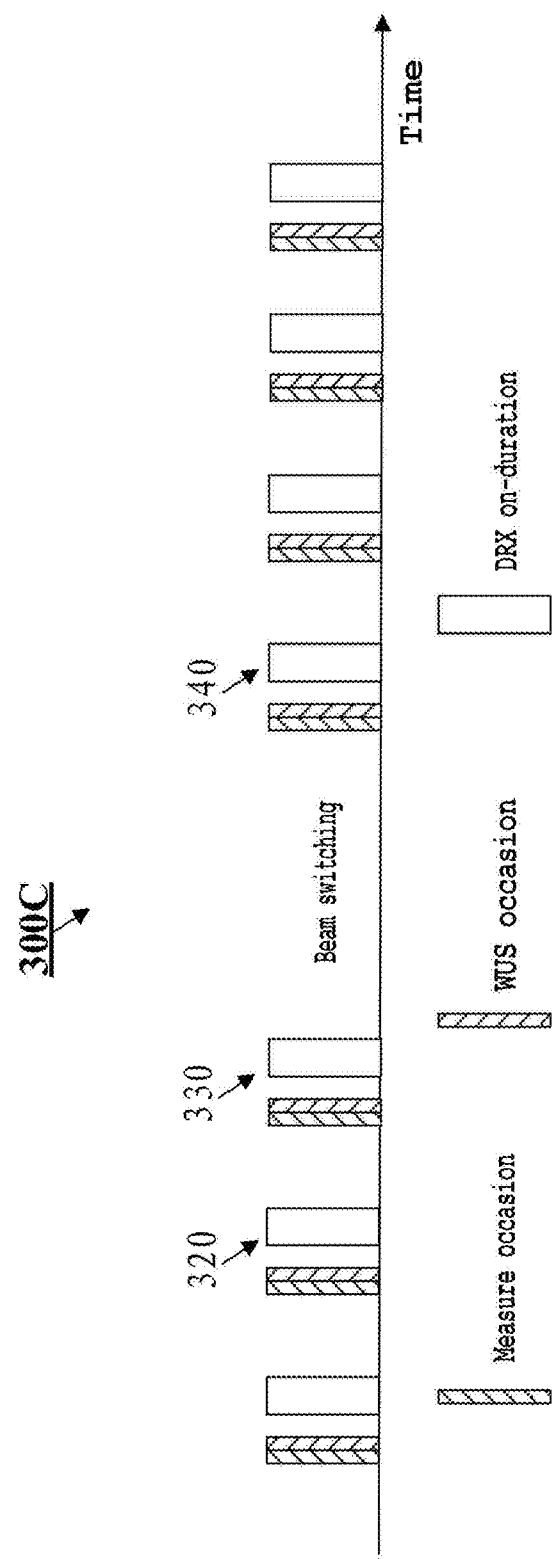
FIG. 15C illustrates a schematic diagram of a third example of downlink measurement according to an embodiment of the present disclosure.

FIG. 15C illustrates a third example schematic diagram 300C of downlink measurements according to an embodiment of the present disclosure.

In one embodiment, it may be determined that the terminal device 102 wakes up based on downlink quality values obtained by a fourth number of measurements being worse than a third threshold. Here, the third threshold may be worse than the second threshold, which means that the downlink quality corresponding to the third threshold is worse than the downlink quality corresponding to the second threshold. As an example, the fourth number may be 3, 2, etc.

As shown in FIG. 15C, for the 3 measurement occasions on the left, the downlink quality during DRX on-durations 320 and 330 are both worse than the third threshold. Accordingly, the terminal device 102 may wake up. In this embodiment, the condition worse than the third threshold reflects a state in which the link quality has deteriorated. Waking up at this time can help the terminal device or the base station to perform resource adjustment immediately.

In an embodiment, the terminal device 102 may send a downlink measurement report to the base station 101 once waking up. In the case of beamforming, the terminal device 102 may also perform beam switching once waking up.

In one embodiment, it may also be determined that the terminal device 102 wakes up based on downlink quality values obtained by a fifth number of measurements being worse than a fourth threshold. Here, the fifth number is less than the fourth number, and the fourth threshold is worse than the third threshold. That is, the worse the quality of the downlink measurements, the fewer measurements can trigger the terminal device 102 to wake up.

It should be understood that the numbers of downlink measurements mentioned in this disclosure are merely examples. On the premise of satisfying the defined relative relationship, any number is feasible, and is not limited to above examples. In a 5G NR system, a larger number of downlink measurements can be set up for the FR2 band than for the FR1 band.

In the examples of FIGS. 15A-15C, subsequent operations of the terminal device 102 is determined based on a comparison of each of a certain number of downlink quality values with one or more thresholds. Alternatively or additionally, an average of a certain number of downlink quality values may be considered, such as a statistical average, a moving average, or the like. In one embodiment, considering a weighted moving average of a certain number of downlink quality values. In this way, the most recent downlink quality value is given a higher weight so that the most recent downlink quality value is more taken into account in determining subsequent operations.

FIG. 16 illustrates a fourth example schematic diagram 400A of downlink measurements according to an embodiment of the present disclosure. FIG. 16 illustrates the DRX on-duration 340 in FIG. 15C in further detail. As shown in FIG. 16, in the embodiment, after the terminal device 102 completes beam switching, a first timer may be started at the beginning of the on-duration 340 of the subsequent DRX cycle. The value of the first timer is less than the on-duration of the DRX cycle, e.g., as shown in FIG. 16. In this way, if the terminal device 102 does not receive any downlink transmissions before the first timer expires, it may go to sleep for the remaining on-duration of the current DRX cycle. Here, by going to sleep early, the terminal device 102 can further reduce power consumption associated with listening to a control channel.

As described above, with WUS occasions set, the terminal device 102 may listen to the control channel during the on-duration only after listened a WUS, and remain to sleep during other on-durations. If the downlink quality is poor, it may happen that the terminal device 102 misses detecting WUS. In this way, the terminal device 102 will remain in the sleep state continuously and thus miss listening to the control channel and receiving corresponding downlink information or data. Poor downlink quality values can also cause the terminal device 102 to perform beam switching, as described with reference to FIG. 15C. Therefore, two example scenarios in which both beam switching and missing detecting WUS occur are described below.

In the first scenario, missing detecting WUS has been continued for a period of time before beam switching. Since no feedback from the terminal device 102 for downlink transmission is received, the base station 101 can learn the occurrence of scheduling loss and missing detecting WUS. At this time, the base station 101 cannot wake up the terminal device 102, and can only send a message to the terminal device 102 as soon as possible after it wakes up. For example, as soon as the terminal device 102 wakes up or starts to channel listening, the base station 101 sends it scheduling or reconfiguration information that may have been missed before. For example, the DRX on-duration 340 shown in FIG. 16 is a first DRX on-duration after beam switching, and the terminal device 102 will listen to the control channel during 340. Accordingly, the base station 101 may send scheduling or reconfiguration information to the terminal device 102 at the beginning of 340. The terminal device 102 receives the scheduling or reconfiguration information before the first timer expires and can therefore remain awake throughout 340. In a case that missing detecting WUS does not occur, the terminal device 102 will not receive scheduling or reconfiguration information until the first timer expires, so it can go to sleep after the first timer expires to reduce power consumption.

In the second scenario, during beam switching, missing detecting WUS may occur. For example, missing detecting WUS may occur during a WUS occasion prior to the DRX on-duration 340. In this case, since the terminal device 102 just switched to a new beam, it would listen to control channel during 340, even though no WUS was received prior to 340. Therefore, missing detecting WUS that occurred during beam switching does not have much impact on the terminal device 102. In a case that there was no WUS sent originally, the terminal device 102 would not receive any information or messages before the first timer expires, so it can go to sleep after the first timer expires to reduce power consumption.

In embodiments of the present disclosure, different measurement indicators may be used to reflect downlink quality. The measurement indicators may include but are not limited to Block Error Rate (BLER), Reference Signal Received Power (RSRP) or Reference Signal Received Quality (RSRQ). Accordingly, corresponding one or more thresholds may be configured for different measurement indicators.

Table 3 below illustrates examples of thresholds for BLER. Corresponding thresholds can be similarly configured for other indicators. It should be understood that the fact that one threshold or downlink quality value being better than another threshold does not necessarily mean that the former's numerical value is greater than that of the latter, but that the downlink quality reflected by the former is better than the quality corresponding to the latter.

TABLE 3

BLER threshold example

| first threshold | second threshold | third threshold | fourth threshold |
| --- | --- | --- | --- |
| 2% | 10% | 12.5% | 15% |

It should be understood that the legends representing time in FIGS. 15A to 16 are for illustration only. In some embodiments, various legends may represent actual size proportionally, although this is not necessarily the case.

Signaling Example

Figure 17:
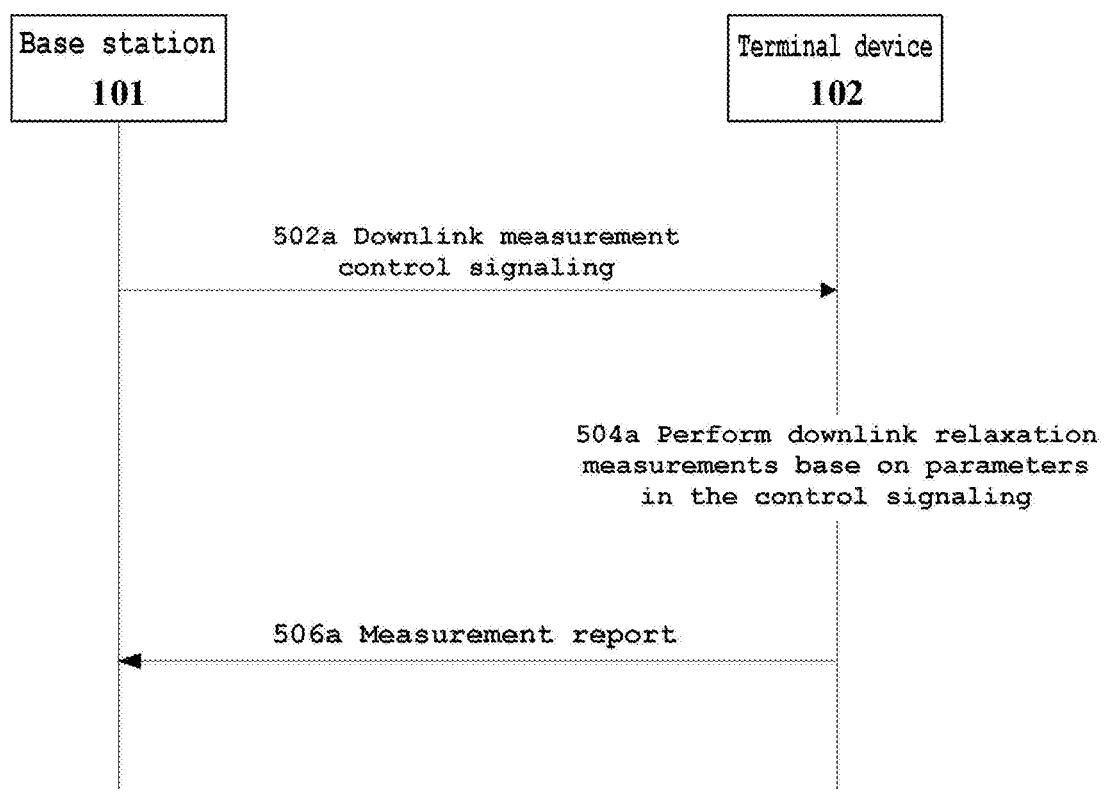
FIG. 17 illustrates an example interaction diagram for downlink measurement between a base station and a terminal device according to an embodiment of the present disclosure.

FIG. 17 illustrates an example interaction diagram for downlink measurements between a base station and a terminal device according to an embodiment of the present disclosure.

As shown in FIG. 17, at 502a, the base station 101 may send configuration information for controlling downlink measurements to the terminal device 102 through a control signaling (e.g., a RRC signaling). The configuration information may include various parameters, such as the number of downlink measurements, the duration of each occasion or period, the first timer value, the quality threshold, etc., with specific reference to the above description. At 504a, the terminal device 102 may perform downlink relaxation measurements in accordance with embodiments of the present disclosure based on various parameters. Optionally, at 506a, the terminal device 102 may further send a measurement report to the base station 101.

Example Method

FIG. 18 illustrates an example method for a terminal device according to an embodiment of the present disclosure. The method may be performed by the terminal device 102 in the system 100 or the electronic device 200a. As shown in FIG. 18, the method 600A may include performing downlink measurements during measurement occasions of one or more DRX cycles, wherein the measurement occasions correspond to particular time-frequency resources (block 602a). The method may further include determining subsequent operations of the terminal device based on a comparison of downlink quality values obtained by a certain number of measurements with one or more thresholds. The subsequent operations include at least the terminal device not performing downlink measurements at subsequent certain period of time or during measurement occasions of a certain number of subsequent DRX cycles, or the terminal device waking up (block 604a). Further details of the method can be understood with reference to above description of the terminal device 102 or the electronic device 200a.

In one embodiment, determining the subsequent operations of a terminal device comprises: based on downlink quality values obtained by a first number of measurements being better than a first threshold, determining that the terminal device does not perform downlink measurements at subsequent certain period of time or during measurement occasions of a certain number of subsequent DRX cycles; or based on downlink quality values obtained by a second number of measurements being better than the first threshold and based on downlink quality history, determining that the terminal device does not perform downlink measurements at subsequent certain period of time or during measurement occasions of a certain number of subsequent DRX cycles. The downlink quality history indicates that previously obtained downlink quality values are better than the first threshold, and the second number is less than the first number.

In one embodiment, determining subsequent operations of a terminal device further comprises: based on downlink quality values obtained by a third number of measurements being worse than the first threshold and better than the second threshold, determining that the terminal device resumes performing downlink measurements during measurement occasions of subsequent DRX cycles.

In one embodiment, determining subsequent operations of a terminal device comprises: based on downlink quality values obtained by a fourth number of measurements being worse than a third threshold, determining that the terminal device wakes up; or based on downlink quality values obtained by a fifth number of measurements being worse than the fourth threshold, determining that the terminal device wakes up. The fifth number is less than the fourth number, and the fourth threshold is worse than the third threshold.

In one embodiment, the method further comprises causing the terminal device to send a downlink measurement report to abase station and/or perform beam switching once waking up.

In one embodiment, the method further comprises causing the terminal device to start a first timer at the beginning of the on-duration of the next DRX cycle after completing the beam switching, wherein the value of the first timer is less than the on-duration of the DRX cycle; and putting the terminal device into sleep for the remaining on-duration of the current DRX cycle if the terminal device does not receive any downlink transmissions before the first timer expires.

In one embodiment, the downlink measurements include at least one of Radio Link Monitoring (RLM) or Beam Failure Detection (BFD).

In one embodiment, the method further comprises receiving a control signaling from a base station, the control signaling including parameters related to the number of measurements, duration, timer value and threshold.

Aspects of the present disclosure can be implemented in the following exemplary ways.

Clause 1. An electronic device for a base station providing a serving cell for a plurality of terminal devices, the electronic device including a processing circuit configured to:

instruct at least one of the plurality of terminal devices to perform radio resource management measurements with a first cycle; and configure a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle.

Clause 2. The electronic device of Clause 1, the processing circuit is further configured to include a condition for enabling the measurement cycle relaxation mechanism in the radio resource control signaling for the at least one terminal device to autonomously enable the measurement cycle relaxation mechanism.

Clause 3. The electronic device of Clause 2, the condition for enabling the measurement cycle relaxation mechanism comprises that fluctuation levels of serving cell measurement results of the at least one terminal device being lower than a first fluctuation threshold and/or values of the serving cell measurement results being greater than the first measurement threshold.

Clause 4. The electronic device of Clause 2, the processing circuit is further configured to include a condition for disabling the measurement cycle relaxation mechanism in the radio resource control signaling for the at least one terminal device to autonomously disable the measurement cycle relaxation mechanism.

Clause 5. The electronic device of Clause 1, the processing circuit is further configured to include, in the radio resource control signaling, indication information about a measurement cycle in a case that the measurement cycle relaxation mechanism is enabled.

Clause 6. The electronic device of Clause 1, the processing circuit is further configured to:
determine values and fluctuation levels of serving cell measurement results of the at least one terminal device; and
instruct the at least one terminal device to enable the measurement cycle relaxation mechanism in response to determining that the fluctuation levels of the serving cell measurement results of the at least one terminal device are lower than a first fluctuation threshold and/or the values of the serving cell measurement results are greater than a first measurement threshold.

Clause 7. The electronic device of Clause 6, the processing circuit is further configured to:
instruct the at least one terminal device to enable the measurement cycle relaxation mechanism by one or more bits in a radio resource control information element (RRC IE).

Clause 8. The electronic device of Clause 2 or 6, the processing circuit is further configured to:
in response to determining that the fluctuation levels of the serving cell measurement results of the at least one terminal device are lower than the first fluctuation threshold and/or the values of the serving cell measurement results are greater than the first measurement threshold, the at least one terminal device perform radio resource management measurements with a second cycle greater than the first cycle;
in a case that the measurement cycle is the second cycle, in response to determining that the fluctuation levels of the serving cell measurement results of the at least one terminal device are higher than the second fluctuation threshold and/or the values of the serving cell measurement results are less than the second measurement threshold, or in response to the measurement cycle being the second cycle for a period of time, the at least one terminal device performs radio resource management measurements with the first cycle or the third cycle; and/or
in a case that the measurement cycle is the second cycle, in response to determining that the fluctuation levels of the serving cell measurement results of the at least one terminal device are lower than the third fluctuation threshold and/or the values of the serving cell measurement results are greater than the third measurement threshold, the at least one terminal device performs radio resource management measurements with a fourth cycle,
wherein, the second fluctuation threshold is greater than or equal to the first fluctuation threshold, the second measurement threshold is less than or equal to the first measurement threshold, the third fluctuation threshold is less than the first fluctuation threshold, the third measurement threshold is greater than the first measurement threshold, the third cycle is less than the second cycle and greater than the first cycle, and the fourth cycle is greater than the second cycle.

Clause 9. The electronic device of Clause 8, the processing circuit is further configured to:
in a case of any measurement cycle, receive measurement results from the at least one terminal device once after a plurality of measurement cycles, the measurement result being associated with all or part of measurement results in the plurality of measurement cycles performed by the at least one terminal device.

Clause 10. The electronic device of Clause 9, the processing circuit is further configured to:
send a notification to the at least one terminal device, so that the at least one terminal device sends measurement results once after performing a plurality of measurement cycles.

Clause 11. The electronic device of Clause 8, the processing circuit is further configured to:
receive a measurement result of an overall measurement by the at least one terminal device on neighboring cells every time a fifth cycle greater than the fourth cycle elapsed.

Clause 12. The electronic device of Clause 11, the processing circuit is further configured to instruct the at least one terminal device to perform measurements on a reduced number of neighboring cells,
wherein, for a first terminal device in the at least one terminal device, the reduced number of neighboring cells includes one or more neighboring cells corresponding to the highest one or more measurement results in neighboring cell measurement results of the first terminal device, and/or
wherein, for the first terminal device in the at least one terminal device, the reduced number of neighboring cells includes one or more neighboring cells such that neighboring cell measurement results of the first terminal device for the one or more neighboring cells are the highest one or more measurement results.

Clause 13. The electronic device of Clause 11, the processing circuit is further configured to:
divide the at least one terminal device into a plurality of terminal device groups, and for at least one terminal device group in the plurality of terminal device groups, instruct only one or more terminal devices in the at least one terminal device group to perform neighboring cell measurements.

Clause 14. The electronic device of Clause 13, wherein said only one or more terminal devices in the at least one terminal device group are instructed to perform neighboring cell measurements by one or more bits in an radio resource control reconfiguration information element (RRC Reconfiguration IE) or DCI format 1_1.

Clause 15. The electronic device of Clause 13, wherein:
serving cell measurement results of the only one or more terminal devices in the at least one terminal device group are the lowest one or more measurement results among all terminal devices in the terminal device group.

Clause 16. The electronic device of Clause 10, wherein:
the division of terminal devices is based on geographic areas.

Clause 17. An electronic device for a terminal device having a serving cell and neighboring cells, the electronic device including a processing circuit configured to:
perform radio resource management measurements with a first cycle; and
receive, from a serving cell base station, a radio resource control signaling containing configuration information of a measurement cycle relaxation mechanism, in a case that the measurement cycle relaxation mechanism is enabled, the terminal device performing radio resource management measurements with a measurement cycle greater than the first cycle.

Clause 18. The electronic device of Clause 17, the processing circuit is further configured to: autonomously enable the measurement cycle relaxation mechanism based on a condition for enabling the measurement cycle relaxation mechanism contained in the received radio resource control signaling.

Clause 19. The electronic device of Clause 18, the condition for enabling the measurement cycle relaxation mechanism comprises that fluctuation levels of serving cell measurement results of the terminal device being lower than a first fluctuation threshold and/or values of the serving cell measurement results being greater than a first measurement threshold.

Clause 20. The electronic device of Clause 18, the processing circuit is further configured to: autonomously disable the measurement cycle relaxation mechanism based on a condition for disabling the measurement cycle relaxation mechanism contained in the received radio resource control signaling.

Clause 21. The electronic device of Clause 17, the processing circuit is further configured to obtain, from the received radio resource control signaling, indication information about a measurement cycle in a case that the measurement cycle relaxation mechanism is enabled.

Clause 22. The electronic device of Clause 17, the processing circuit is further configured to:
send the serving cell measurement results to the serving cell base station; and
in a case that the serving cell base station determines that the fluctuation levels of the serving cell measurement results of the at least one terminal device are lower than the first fluctuation threshold and/or the values of the serving cell measurement results are greater than the first measurement threshold, receive an indication to enable the measurement cycle relaxation mechanism from the serving cell base station.

Clause 23. The electronic device of Clause 17, the processing circuit is further configured to:
obtain the indication to enable the measurement cycle relaxation mechanism by receiving one or more bits in the radio resource control information element (RRC IE) from the serving cell base station.

Clause 24. The electronic device of Clause 18 or 22, the processing circuit is further configured to:
in response to the fluctuation levels of the serving cell measurement results of the terminal device being lower than the first fluctuation threshold and/or the values of the serving cell measurement results being greater than the first measurement threshold, perform the radio resource management measurement with a second cycle greater than the first cycle;
in a case that the measurement cycle is the second cycle, in response to the fluctuation levels of the serving cell measurement results of the terminal device being higher than the second fluctuation threshold and/or the values of the serving cell measurement results being less than the second measurement threshold, or in response to the measurement cycle being the second cycle for a period of time, perform the radio resource management measurements with the first cycle or a third cycle; and/or
in a case that the measurement cycle is the second cycle, in response to the fluctuation levels of the serving cell measurement results of the terminal device being lower than the third fluctuation threshold and/or the values of the serving cell measurement results being greater than the third measurement threshold, perform the radio resource management measurements with a fourth cycle,
wherein, the second fluctuation threshold is greater than or equal to the first fluctuation threshold, the second measurement threshold is less than or equal to the first measurement threshold, the third fluctuation threshold is less than the first fluctuation threshold, the third measurement threshold is greater than the first measurement threshold, the third cycle is less than the second cycle and greater than the first cycle, and the fourth cycle is greater than the second cycle.

Clause 25. The electronic device of Clause 24, the processing circuit is further configured to:
in a case of any measurement cycle, send measurement result to the serving cell base station once after a plurality of measurement cycles, the measurement result being associated with all or part of measurement results in the plurality of measurement cycles performed by the terminal device.

Clause 26. The electronic device of Clause 25, the processing circuit is further configured to:
receive a notification from the serving cell base station device, the notification instructing to send measurement result to the serving cell base station once after a plurality of measurement cycles; or
autonomously decide, by the terminal device, to send measurement result to the serving cell base station once after a plurality of measurement cycles.

Clause 27. The electronic device of Clause 24, the processing circuit is further configured to:
send a measurement result of an overall measurement on neighboring cells to the serving cell base station every time a fifth cycle greater than the fourth cycle elapsed.

Clause 28. The electronic device of Clause 27, the processing circuit is further configured to perform measurements on a reduced number of neighboring cells, wherein, the reduced number of neighboring cells includes one or more neighboring cells corresponding to the highest one or more measurement results of neighboring cell measurement results of the terminal device, and/or wherein, the reduced number of neighboring cells includes one or more neighboring cells such that neighboring cell measurement results of the terminal device for the one or more neighboring cells are the highest one or more measurement results.

Clause 29. The electronic device of Clause 27, the processing circuit is further configured to:

receive a notification from the serving cell base station indicating the terminal device as a terminal device performing neighboring cell measurements in a terminal device group to which it belongs, wherein the terminal device group is divided by the serving cell base station.

Clause 30. The electronic device of Clause 29, wherein the notification indicating the terminal device as the terminal device performing neighbor cell measurements in the terminal device group to which it belongs is obtained, by receiving one or more bits in an radio resource control reconfiguration information element (RRC Reconfiguration IE) or DCI format 1_1.

Clause 31. A method for a base station providing a serving cell for a plurality of terminal devices, the method comprising:

instructing at least one of the plurality of terminal devices to perform radio resource management measurements with a first cycle; and configuring a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle.

Clause 32. A method for a terminal device having a serving cell and neighboring cells, the method comprising:

performing radio resource management measurements with a first cycle; and receiving a radio resource control signaling containing configuration information of a measurement cycle relaxation mechanism from a serving cell base station, and in a case that the measurement cycle relaxation mechanism is enabled, the terminal device performing radio resource management measurements with a measurement cycle greater than the first cycle.

Clause 33. A computer-readable storage medium storing one or more instructions that, when executed by one or more processors of an electronic device, cause the electronic device to perform the method of Clause 31 or 32.

Clause 34. An apparatus for wireless communication comprising means for performing the method of Clause 31 or 32.

It should be noted that the application examples described above are merely exemplary. The embodiments of the present disclosure can also be executed in any other appropriate manner in the above application examples, and the advantageous effects obtained by the embodiments of the present disclosure can still be achieved. Moreover, the embodiments of the present disclosure can also be applied to other similar application examples, and the advantageous effects obtained by the embodiments of the present disclosure can still be achieved.

It should be understood that machine-executable instructions in a machine-readable storage medium or program product according to embodiments of the present disclosure may be configured to perform operations corresponding to the device and method embodiments described above. When referring to the above device and method embodiments, the embodiments of the machine-readable storage medium or program product will be apparent to those skilled in the art, and therefore description thereof will not be repeated. Machine-readable storage media and program products for carrying or including the above machine-executable instructions also fall within the scope of the present disclosure. Such storage media may include, but are not limited to, floppy disks, optical disks, magneto-optical disks, memory cards, memory sticks, and the like.

Figure 19:
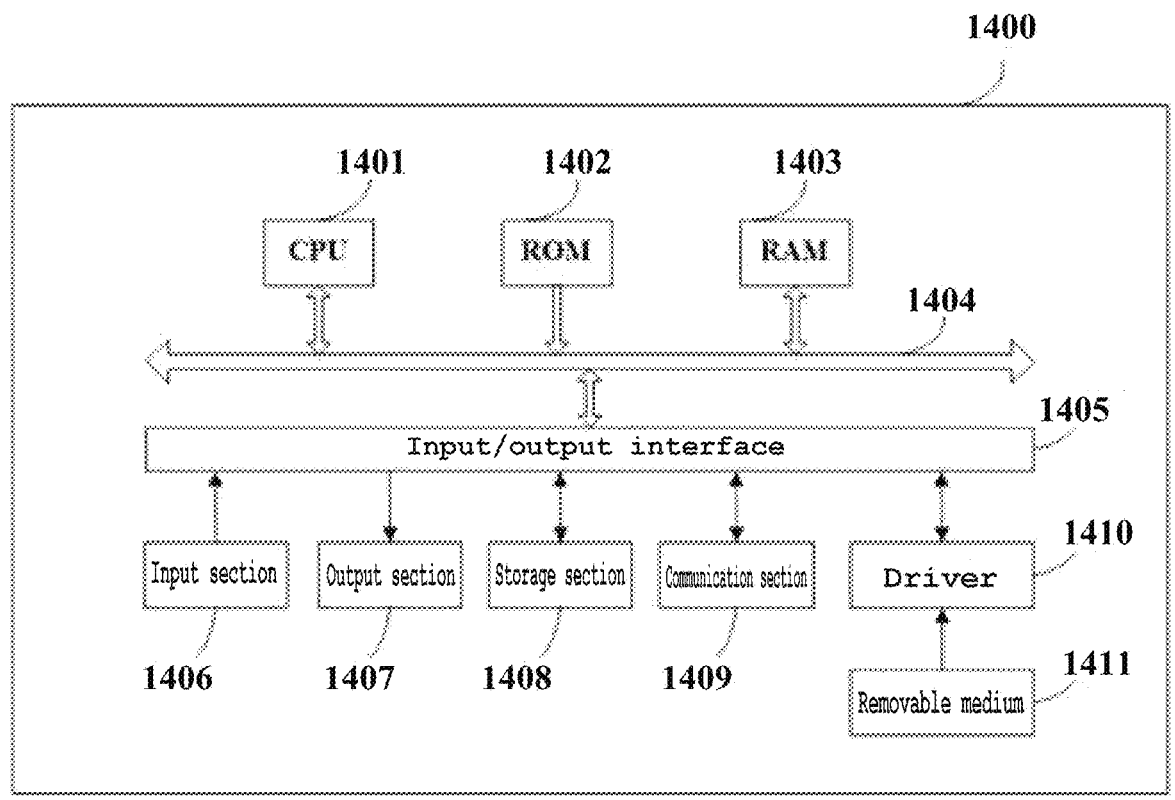
FIG. 19 is a block diagram of an example structure of a personal computer as an information processing device that can be employed in an embodiment of the present disclosure.

In addition, it should be understood that the above series of processes and devices may also be implemented by software and/or firmware. In a case of being implemented by software and/or firmware, a program constituting the software is installed from a storage medium or a network to a computer having a dedicated hardware structure, such as a general-purpose personal computer 1400 shown in FIG. 19, which, when is installed with various programs, can perform various functions and so on. FIG. 19 is a block diagram showing an example structure of a personal computer as an information processing apparatus that can be employed in an embodiment of the present disclosure. In one example, the personal computer may correspond to the above exemplary terminal device according to the present disclosure.

In FIG. 19, a central processing unit (CPU) 1401 executes various processes according to a program stored in a read only memory (ROM) 1402 or a program loaded from a storage section 1408 to a random access memory (RAM) 1403. In the RAM 1403, data required when the CPU 1401 executes various processes and the like is also stored as necessary.

The CPU 1401, the ROM 1402, and the RAM 1403 are connected to each other via a bus 1404. Input/output interface 1405 is also connected to the bus 1404.

The following components are connected to the input/output interface 1405: an input section 1406 including a keyboard, mouse, etc.; an output section 1407 including a display such as a cathode ray tube (CRT), a liquid crystal display (LCD), etc., and a speaker, etc.; the storage section 1408 including a hard disk etc.; and a communication section 1409 including a network interface card such as a LAN card, a modem, etc. The communication section 1409 performs communication processing via a network such as the Internet.

The driver 1410 is also connected to the input/output interface 1405 as needed. A removable medium 1411 such as a magnetic disk, an optical disk, a magneto-optical disk, a semiconductor memory and the like is mounted on the drive 1410 as needed, so that a computer program read therefrom is installed into the storage section 1408 as needed.

In a case that the above series of processing is implemented by software, a program constituting the software is installed from a network such as the Internet or a storage medium such as a removable medium 1411.

It should be understood by those skilled in the art that such a storage medium is not limited to the removable medium 1411 shown in FIG. 19 in which a program is stored and distributed separately from the device to provide the program to the user. Examples of the removable media 1411 include a magnetic disk (including floppy disks (registered trademark)), optical disks (including compact disk read only memory (CD-ROM) and digital versatile disks (DVD)), magneto-optical disks (including mini discs (MD) (registered trademark)) and semiconductor memories. Alternatively, the storage medium may be the ROM 1402, a hard disk included in the storage section 1408, or the like, in which programs are stored and distributed to users together with the devices containing them.

The techniques of the present disclosure can be applied to various products.

For example, the electronic device 200 according to an embodiment of the present disclosure can be implemented as or included in various control devices/base stations, while the method shown in FIG. 12 may also be implemented by various control devices/base stations. For example, the electronic devices 300 and 300a according to the embodiments of the present disclosure can be implemented as or included in various terminal devices/user devices, while the methods shown in FIGS. 13 and 18 may also be implemented by various terminal devices/user devices.

For example, the control device/base station mentioned in this disclosure can be implemented as any type of base station, e.g., an evolved Node B (gNB), such as a macro gNB and a small gNB. The small gNBs can be a gNB covering a cell smaller than macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control wireless communication; and one or more Remote Radio Heads (RRHs) disposed at a different place from the body. In addition, various types of terminals to be described below can each operate as a base station by temporarily or semi-persistently performing base station functions.

For example, the terminal devices mentioned in this disclosure, also referred to as user devices in some examples, can be implemented as mobile terminals (such as smart phones, tablet personal computers (PCs), notebook PCs, portable game terminals, portable/dongle-type mobile routers and digital cameras) or in-vehicle terminals (such as car navigation devices). The user devices may also be implemented as terminals performing machine-to-machine (M2M) communication (also referred to as machine type communication (MTC) terminals). Furthermore, the user devices may be wireless communication modules (such as integrated circuit modules comprising a single die) mounted on each of the above terminals.

Examples according to the present disclosure will be described below with reference to FIGS. 20 to 22.

[Example for Base Station]

It should be understood that the term base station in this disclosure has the full breadth of its ordinary meaning and includes at least a wireless communication station used as part of a wireless communication system or a radio system to facilitate communication. Examples of base stations may be, for example, but not limited to: a base station may be one or both of a base transceiver station (BTS) and a base station controller (BSC) in a GSM system, may be one or both of a radio network controller (RNC) and Node B in a WCDMA system, may be an eNB in a LTE and LTE-Advanced system, or may be a corresponding network node in a future communication system (for example, a gNB, an eLTE eNB and the like that may appear in a 5G communication system). Some functions in the base stations of the present disclosure may also be implemented as entities with control functions to communication in D2D, M2M and V2V communication scenarios, or as entities with spectrum coordination functions in cognitive radio communication scenarios.

First Example

Figure 20:
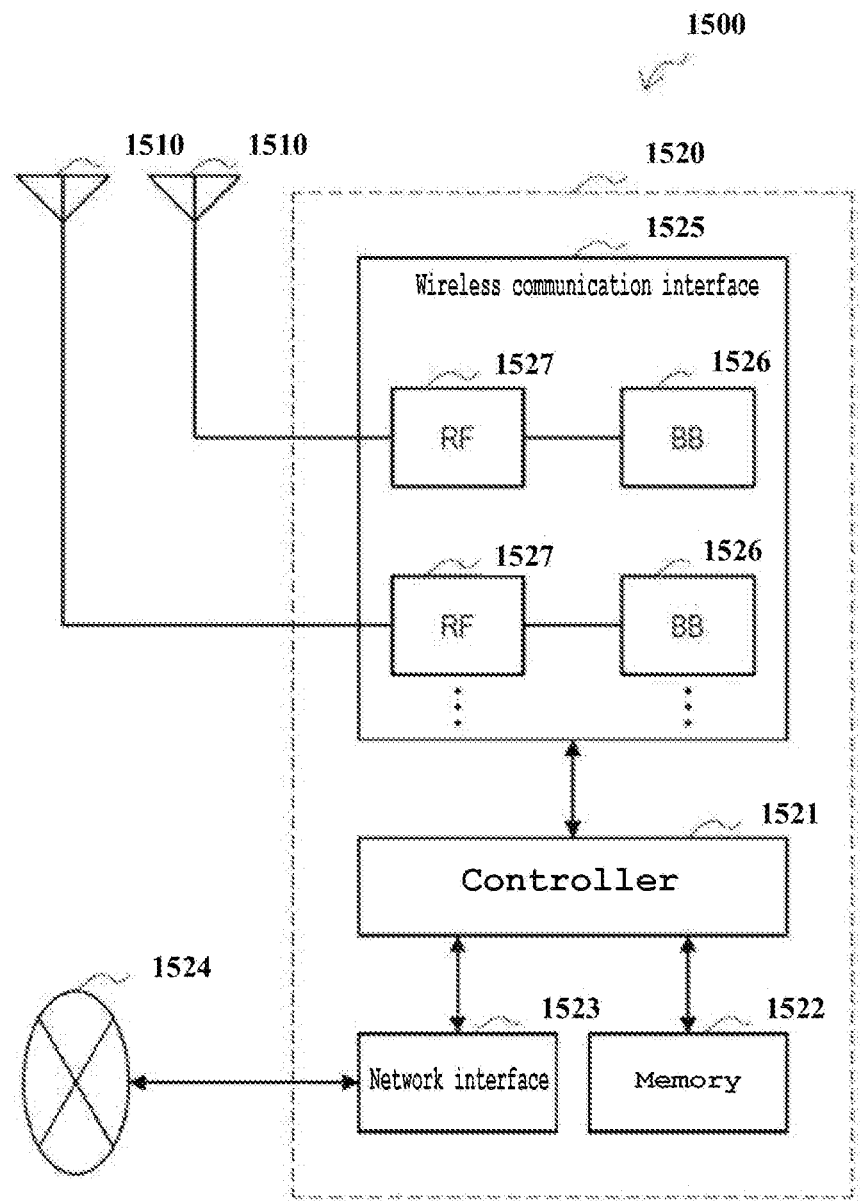
FIG. 20 is a block diagram showing a first example of a schematic configuration of a base station to which the technology of the present disclosure can be applied.

FIG. 20 is a block diagram showing a first example of a schematic configuration of a base station (a gNB is taken as an example in this figure) to which the technology of the present disclosure can be applied. The gNB 1500 includes multiple antennas 1510 and a base station device 1520. The base station device 1520 and each antenna 1510 may be connected to each other via an RF cable. In one implementation, the gNB 1500 (or the base station device 1520) here may correspond to the above base station 101 (or more specifically, the electronic device 200).

Each of the antennas 1510 includes a single or multiple antenna elements (such as multiple antenna elements included in a multiple-input multiple-output (MIMO) antenna), and is used by the base station device 1520 to transmit and receive wireless signals. As shown in FIG. 20, the gNB 1500 may include multiple antennas 1510. For example, the multiple antennas 1510 may be compatible with multiple frequency bands used by the gNB 1500.

The base station device 1520 includes a controller 1521, a memory 1522, a network interface 1523, and a wireless communication interface 1525.

The controller 1521 may be, for example, a CPU or a DSP, and operates various functions of a higher layer of the base station device 1520. For example, the controller 1521 generates data packets from the data in the signal processed by the wireless communication interface 1525, and delivers the generated packets via the network interface 1523. The controller 1521 may bundle data from a plurality of baseband processors to generate a bundled packet, and deliver the generated bundled packet. The controller 1521 may have logical functions to perform controls such as radio resource control, radio bearer control, mobility management, admission control, and scheduling. These controls may be performed in conjunction with nearby gNBs or core network nodes. The memory 1522 includes RAM and ROM, and stores programs executed by the controller 1521 and various types of control data (such as a terminal list, transmission power data, and scheduling data).

The network interface 1523 is a communication interface for connecting the base station device 1520 to the core network 1524. The controller 1521 may communicate with core network nodes or further gNBs via the network interface 1523. In this case, the gNB 1500 and core network nodes or other gNBs may be connected to each other through logical interfaces (such as S1 interface and X2 interface). The network interface 1523 may also be a wired communication interface or a wireless communication interface for wireless backhaul. If the network interface 1523 is a wireless communication interface, the network interface 1523 may use a higher frequency band for wireless communication than the frequency band used by the wireless communication interface 1525.

The wireless communication interface 1525 supports any cellular communication scheme (such as Long Term Evolution (LTE) and LTE-Advanced), and provides wireless connectivity to terminals located in cells of the gNB 1500 via the antenna 1510. The wireless communication interface 1525 may generally include, for example, a baseband (BB) processor 1526 and RF circuit 1527. The BB processor 1526 may perform, for example, encoding/decoding, modulation/demodulation, and multiplexing/demultiplexing, and performs various types of signal processing in layers (for example, L1, Medium Access Control (MAC), Radio Link Control (RLC), and Packet Data Convergence Protocol (PDCP)). In place of the controller 1521, the BB processor 1526 may have some or all of the above logical functions. The BB processor 1526 may be a memory storing a communication control program, or a module including a processor and associated circuit configured to execute the program. Updating the program may cause the functionality of the BB processor 1526 to change. The module may be a card or blade that is inserted into a slot in the base station device 1520. Alternatively, the module can also be a chip mounted on a card or blade. Meanwhile, the RF circuit 1527 may include, for example, a mixer, a filter, and an amplifier, and transmit and receive wireless signals via the antenna 1510. Although FIG. 20 illustrates an example in which one RF circuit 1527 is connected to one antenna 1510, the present disclosure is not limited to this, instead, one RF circuit 1527 may connect multiple antennas 1510 at the same time.

As shown in FIG. 20, the wireless communication interface 1525 may include multiple BB processors 1526. For example, the multiple BB processors 1526 may be compatible with multiple frequency bands used by the gNB 1500. As shown in FIG. 20, the wireless communication interface 1525 may include multiple RF circuits 1527. For example, the multiple RF circuits 1527 may be compatible with multiple antenna elements. Although FIG. 20 illustrates an example in which the wireless communication interface 1525 includes multiple BB processors 1526 and multiple RF circuits 1527, the wireless communication interface 1525 may also include a single BB processor 1526 or a single RF circuit 1527.

Second Example

Figure 21:
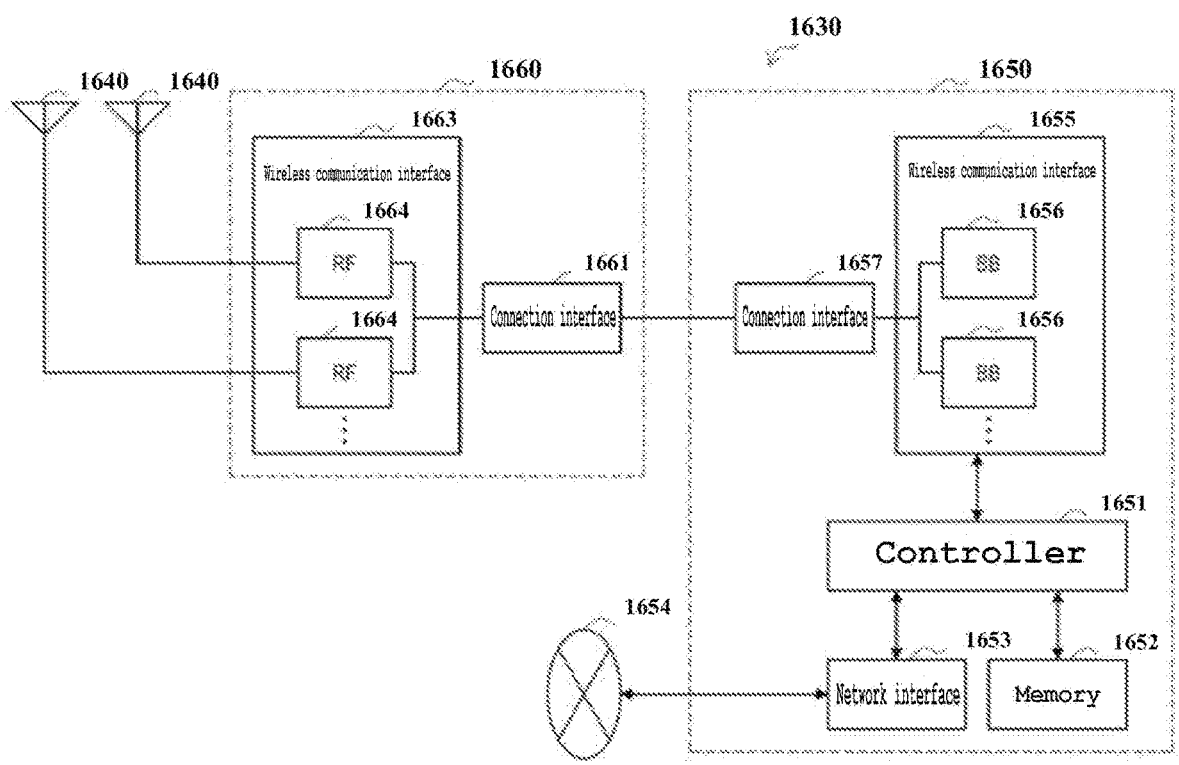
FIG. 21 is a block diagram showing a second example of a schematic configuration of a base station to which the technology of the present disclosure can be applied.

FIG. 21 is a block diagram showing a second example of a schematic configuration of a base station (a gNB is taken as an example in this figure) to which the technology of the present disclosure can be applied. The gNB 1630 includes multiple antennas 1640, a base station device 1650, and a RRH 1660. The RRH 1660 and each antenna 1640 may be connected to each other via an RF cable. The base station device 1650 and the RRH 1660 may be connected to each other via a high-speed line such as an optical fiber cable. In one implementation, the gNB 1630 (or the base station device 1650) here may correspond to the above base station 101 (or more specifically, the electronic device 200).

Each of the antennas 1640 includes a single or multiple antenna elements (such as multiple antenna elements included in a MIMO antenna) and is used by the RRH 1660 to transmit and receive wireless signals. As shown in FIG. 21, the gNB 1630 may include multiple antennas 1640. For example, the multiple antennas 1640 may be compatible with multiple frequency bands used by the gNB 1630.

The base station device 1650 includes a controller 1651, a memory 1652, a network interface 1653, a wireless communication interface 1655, and a connection interface 1657. The controller 1651, the memory 1652 and the network interface 1653 are the same as the controller 1521, the memory 1522 and the network interface 1523 described with reference to FIG. 20.

The wireless communication interface 1655 supports any cellular communication scheme (such as LTE and LTE-Advanced), and provides wireless communication to terminals located in the sector corresponding to RRH 1660 via RRH 1660 and antenna 1640. The wireless communication interface 1655 may generally include, for example, a BB processor 1656. The BB processor 1656 is the same as the BB processor 1526 described with reference to FIG. 20, except that the BB processor 1656 is connected to the RF circuit 1664 of the RRH 1660 via the connection interface 1657. As shown in FIG. 21, the wireless communication interface 1655 may include multiple BB processors 1656. For example, the multiple BB processors 1656 may be compatible with multiple frequency bands used by the gNB 1630. Although FIG. 21 illustrates an example in which the wireless communication interface 1655 includes multiple BB processors 1656, the wireless communication interface 1655 may include a single BB processor 1656.

The connection interface 1657 is an interface for connecting the base station device 1650 (the wireless communication interface 1655) to the RRH 1660. The connection interface 1657 may also be a communication module for communication in the above high-speed line connecting the base station device 1650 (the wireless communication interface 1655) to the RRH 1660.

The RRH 1660 includes a connection interface 1661 and a wireless communication interface 1663.

The connection interface 1661 is an interface for connecting the RRH 1660 (the wireless communication interface 1663) to the base station device 1650. The connection interface 1661 may also be a communication module for communication in the above high-speed line.

The wireless communication interface 1663 transmits and receives wireless signals via the antenna 1640. The wireless communication interface 1663 may typically include an RF circuit 1664, for example. The RF circuit 1664 may include, for example, a mixer, a filter, and an amplifier, and transmit and receive wireless signals via antenna 1640. Although FIG. 21 illustrates an example in which one RF circuit 1664 is connected to one antenna 1640, the present disclosure is not limited to this, instead, one RF circuit 1664 may be connected to multiple antennas 1640 at the same time.

As shown in FIG. 21, the wireless communication interface 1663 may include multiple RF circuits 1664. For example, the multiple RF circuits 1664 may support multiple antenna elements. Although FIG. 21 illustrates an example in which the wireless communication interface 1663 includes multiple RF circuits 1664, the wireless communication interface 1663 may include a single RF circuit 1664.

[Example for User Device]

Figure 22:
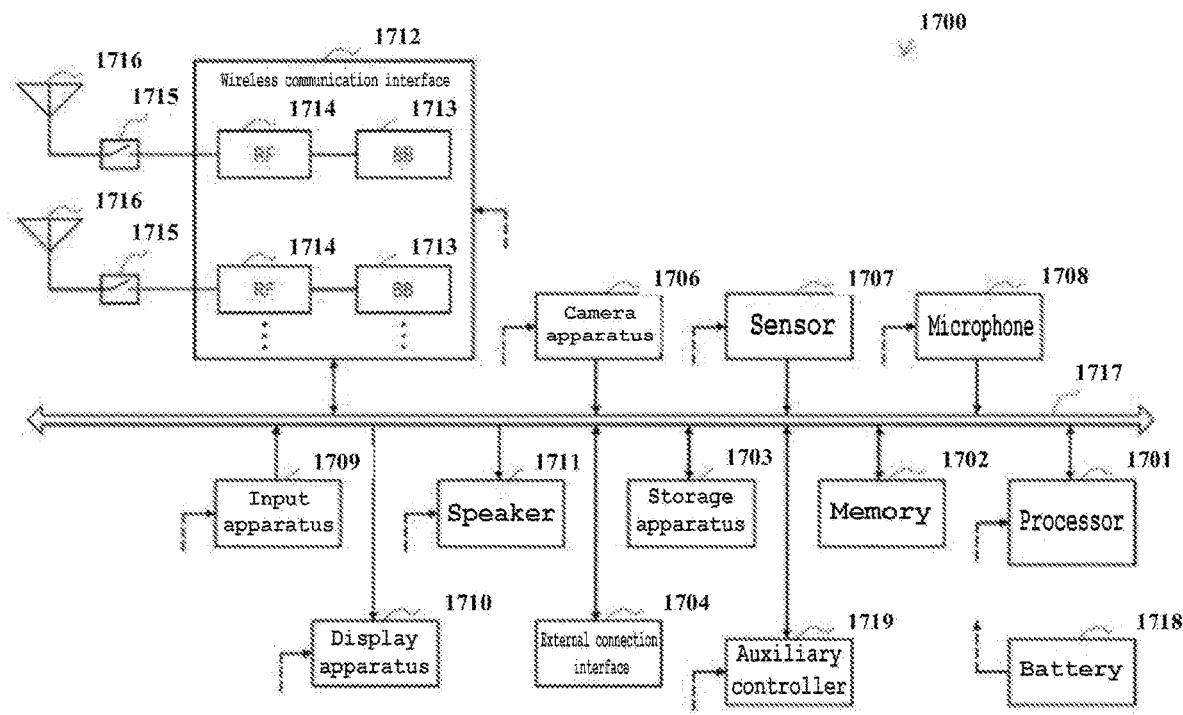
FIG. 22 is a block diagram showing an example of a schematic configuration of a smart phone to which the technology of the present disclosure can be applied.

FIG. 22 is a block diagram showing an example of a schematic configuration of a smart phone 1700 to which the techniques of the present disclosure may be applied. The smart phone 1700 includes a processor 1701, a memory 1702, a storage apparatus 1703, an external connection interface 1704, a camera apparatus 1706, a sensor 1707, a microphone 1708, an input apparatus 1709, a display apparatus 1710, a speaker 1711, a wireless communication interface 1712, one or more antenna switches 1715, one or more antennas 1716, a bus 1717, a battery 1718, and an auxiliary controller 1719. In one implementation, the smart phone 1700 (or the processor 1701) here may correspond to the above terminal device 102 (or more specifically, the electronic devices 300 and 300*a*).

The processor 1701 may be, for example, a CPU or a system on a chip (SoC), and controls functions of the application layer and further layers of the smart phone 1700. The memory 1702 includes RAM and ROM, and stores data and programs executed by the processor 1701. The storage apparatus 1703 may include a storage medium such as a semiconductor memory and a hard disk. The external connection interface 1704 is an interface for connecting an external apparatus (such as a memory card and a Universal Serial Bus (USB) apparatus) to the smart phone 1700.

The camera apparatus 1706 includes an image sensor (such as a charge coupled device (CCD) and a complementary metal oxide semiconductor (CMOS)), and generates captured images. The sensor 1707 may include a set of sensors, such as measurement sensors, gyroscope sensors, geomagnetic sensors, and acceleration sensors. The microphone 1708 converts the sound input to the smart phone 1700 into an audio signal. The input apparatus 1709 includes, for example, a touch sensor configured to detect a touch on the screen of the display apparatus 1710, a keypad, a keyboard, a button, or a switch, and receives operations or information input from a user. The display apparatus 1710 includes a screen (such as a liquid crystal display (LCD) and an organic light emitting diode (OLED) display), and displays an output image of the smart phone 1700. The speaker 1711 converts an audio signal output from the smart phone 1700 into sound.

The wireless communication interface 1712 supports any cellular communication scheme (such as LTE and LTE-Advanced), and performs wireless communication. The wireless communication interface 1712 may generally include, for example, a BB processor 1713 and an RF circuit 1714. The BB processor 1713 may perform, for example, encoding/decoding, modulation/demodulation, and multiplexing/demultiplexing, and perform various types of signal processing for wireless communication. Meanwhile, the RF circuit 1714 may include, for example, a mixer, a filter, and an amplifier, and transmit and receive wireless signals via the antenna 1716. The wireless communication interface 1712 may be a chip module on which the BB processor 1713 and the RF circuit 1714 are integrated. As shown in FIG. 22, the wireless communication interface 1712 may include multiple BB processors 1713 and multiple RF circuits 1714. Although FIG. 22 illustrates an example in which the wireless communication interface 1712 includes multiple BB processors 1713 and multiple RF circuits 1714, the wireless communication interface 1712 may include a single BB processor 1713 or a single RF circuit 1714.

Furthermore, in addition to cellular communication schemes, the wireless communication interface 1712 may support additional types of wireless communication schemes, such as short-range wireless communication schemes, near field communication schemes, and wireless local area network (LAN) schemes. In this case, the wireless communication interface 1712 may include a BB processor 1713 and an RF circuit 1714 for each wireless communication scheme.

Each of the antenna switches 1715 switches the connection destination of the antenna 1716 among a plurality of circuits (e.g., circuits for different wireless communication schemes) included in the wireless communication interface 1712.

Each of the antennas 1716 includes a single or multiple antenna elements (such as multiple antenna elements included in a MIMO antenna), and is used for the wireless communication interface 1712 to transmit and receive wireless signals. As shown in FIG. 22, the smart phone 1700 may include multiple antennas 1716. Although FIG. 22 illustrates an example in which the smart phone 1700 includes multiple antennas 1716, the smart phone 1700 may also include a single antenna 1716.

Furthermore, the smart phone 1700 may include an antenna 1716 for each wireless communication scheme. In this case, the antenna switch 1715 can be omitted from the configuration of the smart phone 1700.

The bus 1717 connects the processor 1701, the memory 1702, the storage apparatus 1703, the external connection interface 1704, the camera apparatus 1706, the sensor 1707, the microphone 1708, the input apparatus 1709, the display apparatus 1710, the speaker 1711, the wireless communication interface 1712, and the auxiliary controller 1719 to each other. The battery 1718 provides power to the various blocks of the smart phone 1700 shown in FIG. 22 via feeders, which are partially shown in phantom in the figure. The auxiliary controller 1719 operates the minimum necessary functions of the smart phone 1700, e.g., in sleep mode.

The exemplary embodiments of the present disclosure have been described above with reference to the drawings, but the present disclosure is not of course limited to the above examples. Those skilled in the art may find various changes and modifications within the scope of the appended claims, and it should be understood that these changes and modifications will naturally fall within the technical scope of the present disclosure.

For example, a plurality of functions included in one unit in the above embodiments may be implemented by separate apparatus. Alternatively, the plurality of functions implemented by multiple units in the above embodiments may be implemented by separate apparatus, respectively. Additionally, one of the above functions may be implemented by multiple units. Needless to say, such a configuration is included in the technical scope of the present disclosure.

In this specification, the steps described in the flowchart include not only processes performed in time sequence in the stated order, but also processes performed in parallel or individually rather than necessarily in time sequence. Furthermore, even in the steps processed in time sequence, needless to say, the order can be appropriately changed.

Although the present disclosure and its advantages have been described in detail, it should be understood that various changes, substitutions and alterations can be made herein without departing from the spirit and scope of the disclosure as defined by the appended claims. Furthermore, the terms "comprise", "include" or any other variation thereof in embodiments of the present disclosure are intended to encompass a non-exclusive inclusion, such that a process, method, article or device comprising a series of elements includes not only those elements, but also include other elements not expressly listed, or include elements inherent to such process, method, article or device. Without further limitation, an element defined by the phrase "comprising one . . . " does not preclude the presence of additional identical elements in a process, method, article or device that includes the element.

What is claimed is:

1. An electronic device for a base station providing a serving cell for a plurality of terminal devices, the electronic device including a processing circuit configured to:
   - instruct at least one terminal device of the plurality of terminal devices to perform radio resource management measurements with a first cycle; and
   - configure a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle,
   - wherein the processing circuit is further configured to include a condition for enabling the measurement cycle relaxation mechanism in the radio resource control signaling for the at least one terminal device to autonomously enable the measurement cycle relaxation mechanism, wherein the condition for enabling the measurement cycle relaxation mechanism comprises that fluctuation levels of serving cell measurement results of the at least one terminal device being lower than a first fluctuation threshold and values of the serving cell measurement results being greater than a first measurement threshold, wherein the processing circuit is further configured to include a condition for disabling the measurement cycle relaxation mechanism in the radio resource control signaling for the at least one terminal device to autonomously disable the measurement cycle relaxation mechanism, wherein the condition for disabling the measurement cycle relaxation mechanism comprises that the fluctuation levels of serving cell measurement results of the at least one terminal device being higher than the first fluctuation threshold and values of the serving cell measurement results being lower than the first measurement threshold, wherein the processing circuit is further configured to:
 in response to determining that the fluctuation levels of the serving cell measurement results of the at least one terminal device are lower than the first fluctuation threshold and the values of the serving cell measurement results are greater than the first measurement threshold, control the at least one terminal device to perform radio resource management measurements with a second cycle greater than the first cycle;
 in a case that the measurement cycle is the second cycle, in response to determining that the fluctuation levels of the serving cell measurement results of the at least one terminal device are higher than a second fluctuation threshold and the values of the serving cell measurement results are less than a second measurement threshold, or in response to the measurement cycle being the second cycle for a period of time, control the at least one terminal device to radio resource management measurements with the first cycle or a third cycle; and
 in a case that the measurement cycle is the second cycle, in response to determining that the fluctuation levels of the serving cell measurement results of the at least one terminal device are lower than a third fluctuation threshold and the values of the serving cell measurement results are greater than a third measurement threshold, control the at least one terminal device to radio resource management measurements with a fourth cycle,
 in a case that the measurement cycle is the first cycle, in response to determining that the fluctuation levels of the serving cell measurement results of the at least one terminal device are greater than a fourth fluctuation threshold and the values of the serving cell measurement results are less than a fourth measurement threshold, control the at least one terminal device to disable the measurement cycle relaxation mechanism, wherein:
 the second fluctuation threshold is greater than or equal to the first fluctuation threshold,
 the second measurement threshold is less than or equal to the first measurement threshold,
 the third fluctuation threshold is less than the first fluctuation threshold,
 the third measurement threshold is greater than the first measurement threshold,
 the third cycle is less than the second cycle and greater than the first cycle, and
 the fourth cycle is greater than the second cycle,
 the fourth fluctuation threshold is greater than the second fluctuation threshold,
 the fourth measurement threshold is less than the third measurement threshold, wherein the method further comprises:
 in a case of any measurement cycle, receiving measurement results from the at least one terminal device once after a plurality of measurement cycles, the measurement result being associated with all or part of measurement results in the plurality of measurement cycles performed by the at least one terminal device; and
 send a notification to the at least one terminal device, so that the at least one terminal device sends measurement results once after performing the plurality of measurement cycles, wherein the method further comprises receiving a measurement result of an overall measurement by the at least one terminal device on neighboring cells every time a fifth cycle greater than the fourth cycle elapses.

2. The electronic device of claim 1, the processing circuit is further configured to instruct the at least one terminal device to perform measurements on a reduced number of neighboring cells,
 wherein, for a first terminal device in the at least one terminal device, the reduced number of neighboring cells includes one or more neighboring cells corresponding to the highest one or more measurement results in neighboring cell measurement results of the first terminal device, and
 wherein, for the first terminal device in the at least one terminal device, the reduced number of neighboring cells includes one or more neighboring cells such that neighboring cell measurement results of the first terminal device for the one or more neighboring cells are the highest one or more measurement results.

3. The electronic device of claim 1, the processing circuit is further configured to:
 divide the at least one terminal device into a plurality of terminal device groups, and for at least one terminal device group in the plurality of terminal device groups, instruct only one or more terminal devices in the at least one terminal device group to perform neighboring cell measurements,
 wherein said only one or more terminal devices in the at least one terminal device group are instructed to perform neighboring cell measurements by one or more bits in a radio resource control reconfiguration information element (RRC Reconfiguration IE) or a downlink control information (DCI) format 1_1, and
 wherein serving cell measurement results of the only one or more terminal devices in the at least one terminal device group are the lowest one or more measurement results among all terminal devices in the terminal device group.

4. A method performed by a processing circuit of an electronic device for a base station providing a serving cell for a plurality of terminal devices, the method comprising:

instructing at least one terminal device of the plurality of terminal devices to perform radio resource management measurements with a first cycle; and configuring a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle, wherein the method further comprises including a condition for enabling the measurement cycle relaxation mechanism in the radio resource control signaling for the at least one terminal device to autonomously enable the measurement cycle relaxation mechanism, wherein the condition for enabling the measurement cycle relaxation mechanism comprises that fluctuation levels of serving cell measurement results of the at least one terminal device being lower than a first fluctuation threshold and values of the serving cell measurement results being greater than a first measurement threshold, wherein the method further comprises including a condition for disabling the measurement cycle relaxation mechanism in the radio resource control signaling for the at least one terminal device to autonomously disable the measurement cycle relaxation mechanism, wherein the condition for disabling the measurement cycle relaxation mechanism comprises that the fluctuation levels of serving cell measurement results of the at least one terminal device being higher than the first fluctuation threshold and values of the serving cell measurement results being lower than the first measurement threshold, wherein the method further comprises:
  in response to determining that the fluctuation levels of the serving cell measurement results of the at least one terminal device are lower than the first fluctuation threshold and the values of the serving cell measurement results are greater than the first measurement threshold, controlling the at least one terminal device to perform radio resource management measurements with a second cycle greater than the first cycle;
  in a case that the measurement cycle is the second cycle, in response to determining that the fluctuation levels of the serving cell measurement results of the at least one terminal device are higher than a second fluctuation threshold and the values of the serving cell measurement results are less than a second measurement threshold, or in response to the measurement cycle being the second cycle for a period of time, controlling the at least one terminal device to perform radio resource management measurements with the first cycle or a third cycle; and
  in a case that the measurement cycle is the second cycle, in response to determining that the fluctuation levels of the serving cell measurement results of the at least one terminal device are lower than a third fluctuation threshold and the values of the serving cell measurement results are greater than a third measurement threshold, controlling the at least one terminal device to perform radio resource management measurements with a fourth cycle,
  in a case that the measurement cycle is the first cycle, in response to determining that the fluctuation levels of the serving cell measurement results of the at least one terminal device are greater than a fourth fluctuation threshold and the values of the serving cell measurement results are less than a fourth measurement threshold, controlling the at least one terminal device to disable the measurement cycle relaxation mechanism, wherein:
  the second fluctuation threshold is greater than or equal to the first fluctuation threshold,
  the second measurement threshold is less than or equal to the first measurement threshold,
  the third fluctuation threshold is less than the first fluctuation threshold,
  the third measurement threshold is greater than the first measurement threshold,
  the third cycle is less than the second cycle and greater than the first cycle, and
  the fourth cycle is greater than the second cycle,
  the fourth fluctuation threshold is greater than the second fluctuation threshold,
  the fourth measurement threshold is less than the third measurement threshold, wherein the method further comprises:
  in a case of any measurement cycle, receiving measurement results from the at least one terminal device once after a plurality of measurement cycles, the measurement result being associated with all or part of measurement results in the plurality of measurement cycles performed by the at least one terminal device; and
  sending a notification to the at least one terminal device, so that the at least one terminal device sends measurement results once after performing the plurality of measurement cycles, wherein the method further comprises receiving a measurement result of an overall measurement by the at least one terminal device on neighboring cells every time a fifth cycle greater than the fourth cycle elapses.

5. A non-transitory computer readable product containing instructions for causing a processing circuit of an electronic device for a base station providing a serving cell for a plurality of terminal devices to perform a method, the method comprising:

instructing at least one terminal device of the plurality of terminal devices to perform radio resource management measurements with a first cycle; and configuring a measurement cycle relaxation mechanism for the at least one terminal device through a radio resource control signaling, in a case that the measurement cycle relaxation mechanism is enabled, the at least one terminal device performing radio resource management measurements with a measurement cycle greater than the first cycle, wherein the method further comprises including a condition for enabling the measurement cycle relaxation mechanism in the radio resource control signaling for the at least one terminal device to autonomously enable the measurement cycle relaxation mechanism, wherein the condition for enabling the measurement cycle relaxation mechanism comprises that fluctuation levels of serving cell measurement results of the at least one terminal device being lower than a first fluctuation threshold and values of the serving cell measurement results being greater than a first measurement threshold, wherein the method further comprises including a condition for disabling the measurement cycle relaxation mechanism in the radio resource control signaling for the at least one terminal device to autonomously disable the measurement cycle relaxation mechanism, wherein the condition for disabling the measurement cycle relaxation mechanism comprises that the fluctuation levels of serving cell measurement results of the at least one terminal device being higher than the first fluctuation threshold and values of the serving cell measurement results being lower than the first measurement threshold, wherein the method further comprises:
  in response to determining that the fluctuation levels of the serving cell measurement results of the at least one terminal device are lower than the first fluctuation threshold and the values of the serving cell measurement results are greater than the first measurement threshold, controlling the at least one terminal device to perform radio resource management measurements with a second cycle greater than the first cycle;
  in a case that the measurement cycle is the second cycle, in response to determining that the fluctuation levels of the serving cell measurement results of the at least one terminal device are higher than a second fluctuation threshold and the values of the serving cell measurement results are less than a second measurement threshold, or in response to the measurement cycle being the second cycle for a period of time, controlling the at least one terminal device to perform radio resource management measurements with the first cycle or a third cycle; and
  in a case that the measurement cycle is the second cycle, in response to determining that the fluctuation levels of the serving cell measurement results of the at least one terminal device are lower than a third fluctuation threshold and the values of the serving cell measurement results are greater than a third measurement threshold, controlling the at least one terminal device to perform radio resource management measurements with a fourth cycle,
  in a case that the measurement cycle is the first cycle, in response to determining that the fluctuation levels of the serving cell measurement results of the at least one terminal device are greater than a fourth fluctuation threshold and the values of the serving cell measurement results are less than a fourth measurement threshold, controlling the at least one terminal device to disable the measurement cycle relaxation mechanism, wherein:
  the second fluctuation threshold is greater than or equal to the first fluctuation threshold,
  the second measurement threshold is less than or equal to the first measurement threshold,
  the third fluctuation threshold is less than the first fluctuation threshold,
  the third measurement threshold is greater than the first measurement threshold,
  the third cycle is less than the second cycle and greater than the first cycle, and
  the fourth cycle is greater than the second cycle,
  the fourth fluctuation threshold is greater than the second fluctuation threshold,
  the fourth measurement threshold is less than the third measurement threshold, wherein the method further comprises:
  in a case of any measurement cycle, receiving measurement results from the at least one terminal device once after a plurality of measurement cycles, the measurement result being associated with all or part of measurement results in the plurality of measurement cycles performed by the at least one terminal device; and
  sending a notification to the at least one terminal device, so that the at least one terminal device sends measurement results once after performing the plurality of measurement cycles, wherein the method further comprises receiving a measurement result of an overall measurement by the at least one terminal device on neighboring cells every time a fifth cycle greater than the fourth cycle elapses.

* * * * *